United States Patent
Suss et al.

(10) Patent No.: US 12,012,342 B2
(45) Date of Patent: Jun. 18, 2024

(54) METHOD FOR SELECTIVE SEPARATION OF MONOVALENT IONIC SPECIES USING ELECTRODES FUNCTIONALIZED WITH SULFONIC GROUPS

(71) Applicant: Technion Research and Development Foundation Limited, Haifa (IL)

(72) Inventors: Matthew E. Suss, Nesher (IL); Eric N. Guyes, Haifa (IL); Yinke Chen, Haifa (IL); Charles E. Diesendruck, Binyamina-Givat Ada (IL)

(73) Assignee: Technion Research & Development Foundation Limited, Haifa (IL)

( * ) Notice: Subject to any disclaimer, the term of this patent is extended or adjusted under 35 U.S.C. 154(b) by 225 days.

(21) Appl. No.: 17/462,054

(22) Filed: Aug. 31, 2021

(65) Prior Publication Data

US 2022/0064029 A1     Mar. 3, 2022

Related U.S. Application Data

(60) Provisional application No. 63/072,954, filed on Sep. 1, 2020.

(51) Int. Cl.
*C02F 1/469* (2023.01)
*C02F 1/461* (2023.01)
*C02F 103/08* (2006.01)

(52) U.S. Cl.
CPC ........ *C02F 1/4691* (2013.01); *C02F 1/46109* (2013.01); *C02F 2001/46133* (2013.01);
(Continued)

(58) Field of Classification Search
CPC .......... C02F 1/4691; C02F 2001/46133; C02F 2001/46161; C02F 2001/46138; C02F 2103/08
See application file for complete search history.

(56) References Cited

U.S. PATENT DOCUMENTS 3,519,452 A    7/1970    Rivin et al.
6,309,532 B1   10/2001   Tran et al.
(Continued)

FOREIGN PATENT DOCUMENTS

CN      108483591 A    9/2018
WO   2020049559 A1    3/2020

OTHER PUBLICATIONS

Gernon et al. "Environmental benefits of methanesulfonic acid: Comparitive properties and advantages" Green Chem., 1999,1, 127-140 (Year: 1999).*
(Continued)

*Primary Examiner* — Alexander W Keeling
*Assistant Examiner* — Alexander R. Parent
(74) *Attorney, Agent, or Firm* — Roach Brown McCarthy & Gruber, P.C.; Kevin D. McCarthy

(57) ABSTRACT

The present invention relates to a method for selective separation of positively charged monovalent ionic species from an ionic solution. The method comprises passing the ionic solution comprising a positively charged monovalent ion and a positively charged polyvalent ion through an electrode capacitor assembly comprising a first electrode and a second electrode, the electrodes comprising nanoporous carbon, wherein the first electrode is modified with sulfonate surface groups; and at least one flow channel for the passage of the solution. The method further comprises charging the electrode capacitor assembly (1) at a voltage of at least about 1.5 V; and/or (2) for scaled charging time of less than about 2.

19 Claims, 10 Drawing Sheets

(52) U.S. Cl.
CPC ............... *C02F 2001/46138* (2013.01); *C02F 2001/46161* (2013.01); *C02F 2103/08* (2013.01)

(56) References Cited

U.S. PATENT DOCUMENTS

| | | | | |
|---|---|---|---|---|
| 6,580,598 | B2* | 6/2003 | Shiue | C02F 1/4691 |
| | | | | 977/842 |
| 7,241,334 | B2* | 7/2007 | Srinivas | C09C 1/56 |
| | | | | 106/472 |
| 7,294,185 | B2 | 11/2007 | Belmont et al. | |
| 9,057,139 | B2 | 6/2015 | Chung et al. | |
| 9,919,937 | B2 | 3/2018 | Ryu et al. | |
| 10,214,437 | B2 | 2/2019 | Blohm et al. | |
| 10,214,438 | B2 | 2/2019 | Blohm et al. | |
| 10,662,082 | B2 | 5/2020 | Subban et al. | |
| 11,739,010 | B2* | 8/2023 | Verduzco | C02F 1/46114 |
| | | | | 204/554 |
| 2005/0263457 | A1* | 12/2005 | Wilkins | C02F 1/283 |
| | | | | 210/748.11 |
| 2009/0255815 | A1* | 10/2009 | Shiue | C02F 1/4691 |
| | | | | 361/301.1 |
| 2014/0346046 | A1 | 11/2014 | Andelman | |
| 2019/0225513 | A1* | 7/2019 | Paranthaman | C02F 1/4691 |
| 2019/0359506 | A1* | 11/2019 | Hawks | C02F 1/4691 |
| 2021/0331947 | A1* | 10/2021 | Suss | C02F 1/4691 |

OTHER PUBLICATIONS

Suss, M. et al. "Capacitive desalination with flow-through electrodes" Energy Environ. Sci., 2012, 5, 9511 (Year: 2012).*

Yang, J. et al. "Ion-selective carbon nanotube electrodes in capacitive deionisation" Electrochimica Acta 91 (2013) 11-19 (Year: 2013).*

Thommes, M., et al. "Physisorption of gases, with special reference to the evaluation of surface area and pore size distribution (IUPAC Technical Report)" Pure and Applied Chemistry 87(9-10) (2015) 1051-1069 (Year: 2015).*

Liu, P. et al. "Grafting sulfonic and amine functional groups on 3D graphene for improved capacitive deionization" J. Mater. Chem. A, 2016, 4, 5303 (Year: 2016).*

Park et al. "Surface-modified spherical activated carbon for high carbon loading and its desalting performance in flow-electrode capacitive deionization" RSC Adv., 2016,6, 69720-69727 (Year: 2016).*

Hassanvand, A. et al. "A comparison of multicomponent electrosorption in capacitive deionization and membrane capacitive deionization" Water Research 131 (2018) 100-109 (Year: 2018).*

Li, Y. et al. "A comparative study on electrosorptive rates of metal ions in capacitive deionization" Journal of Water Process Engineering 26 (2018) 257-263 (Year: 2018).*

Vanýsek, P. "Ionic Conductivity and Diffusion at Infinite Dilution" in CRC Handbook of Chemistry and Physics, 104th Edition (Internet Version 2023), John R. Rumble, ed., CRC Press/Taylor & Francis, Boca Raton, FL. (Year: 2023).*

"Dissociation Constants of Organic Acids and Bases" in CRC Handbook of Chemistry and Physics, 104th Edition (Internet Version 2023), John R. Rumble, ed., CRC Press/Taylor & Francis, Boca Raton, FL (Year: 2023).*

"Standard Atomic Weights," in CRC Handbook of Chemistry and Physics, 104th Edition (Internet Version 2023), John R. Rumble, ed., CRC Press/Taylor & Francis, Boca Raton, FL. (Year: 2023).*

Zhang et al. "Selective ion separation by capacitive deionization (CDI) based technologies: a state-of-the-art review" Environ. Sci.: Water Res. Technol., 2020, 6, 243 (Year: 2019).*

Mubita et al. "Selective adsorption of nitrate over chloride in microporous carbons" Water Research 164 (2019) 114885 (Year: 2019).*

Suss (2017) Size-based ion selectivity of micropore electric double layers in capacitive deionization electrodes. arxiv.org, Cornell University Library. Apr. 13, 2017 (Apr. 13, 2017). 13 pages.

Biesheuvel and van Soestbergen (2007) Counterion volume effects in mixed electrical double layers. Journal of Colloid and Interface Science 316: 490-499 (10 pages).

Biesheuvel et al., (2015) Theory of water desalination by porous electrodes with immobile chemical charge. Colloids and Interface Science Communications 9: 1-5 (5 pages).

Choi et al., (2016) Capacitive deionization (CDI) integrated with monovalent cation selective membrane for producing divalent cation-rich solution. Desalination 400: 38-46 (9 pages).

Cohen et al., (2011) Enhanced charge efficiency in capacitive deionization achieved by surface-treated electrodes and by means of a third electrode. J Phys Chem C 115(40): 19856-19863 (9 pages).

Gao et al., (2015) Surface charge enhanced carbon electrodes for stable and efficient capacitive deionization using inverted adsorption-desorption behavior. Energy Environ Sci 8: 897-909 (13 pages).

Gao et al., (2016) Complementary surface charge for enhanced capacitive deionization. Water Research 92: 275-282 (8 pages).

Guyes et al., (2017) A one-dimensional model for water desalination by flow-through electrode capacitive deionization. Desalination 415: 8-13 (6 pages).

Guyes et al., (2019) Enhancing the Ion-Size-Based Selectivity of Capacitive Deionization Electrodes. Environ Sci Technol 53: 8447-8454. With Supplementary Information (21 pages).

Hawks et al., (2019) Performance metrics for the objective assessment of capacitive deionization systems. Water Research 152: 126-137 (12 pages).

Hemmatifar et al., (2017) Equilibria model for pH variations and ion adsorption in capacitive deionization electrodes. Water Research 122: 387-397 (11 pages).

Hou and Huang (2013) A comparative study of electrosorption selectivity of ions by activated carbon electrodes in capacitive deionization. Desalination 314: 124-129 (6 pages).

Jia and Zou (2012) Wettability and its influence on graphene nansoheets as electrode material for capacitive deionization. Chemical Physics Letters 548: 23-28 (6 pages).

Lee et al., (2011) Preparation of ion exchanger layered electrodes for advanced membrane capacitive deionization (MCDI). Water Research 45(17): 5375-5380 (6 pages).

Min et al., (2018) Improved capacitive deionization of sulfonated carbon/titania hybrid electrode. Electrochimica Acta 270: 543-551 9 pages).

Oyarzun et al., (2018) Adsorption and capacitive regeneration of nitrate using inverted capacitive deionization with surfactant functionalized carbon electrodes. Separation and Purification Technology 194: 410-415 (6 pages).

Park et al., (2016) Surface-modified spherical activated carbon for high carbon loading and its desalting performance in flow-electrode capacitive deionization. RSC Adv: 69720-69727 (8 pages).

Porada et al., (2013) Review on the Science and Technology of Water Desalination by Capacitive Deionization. Progress in Materials Science 58(8): 1388-1442 (55 pages).

Qian et al., (2015) Sulfonated Graphene as Cation-Selective Coating: A New Strategy for High-Performance Membrane Capacitive Deionization. Advanced Materials Interface 2(16): 1500372; (9 pages).

Seo et al., (2010) Investigation on removal of hardness ions by capacitive deionization (CDI) for water softening applications. Water Research 44(7): 2267-2275 (9 pages).

Suss (2017) Size-based ion selectivity of micropore electric double layers in capacitive deionization electrodes. J Electrochem Soc 164: E270-E275 (6 pages).

Suss et al., (2015) Water desalination via capacitive deionization: what is it and what can we expect from it? Energy Environ Sci; DOI: 10.1039/c5ee00519a; (24 pages).

Suss et al., (2018) Water desalination with energy storage electrode materials. Joule 2(1): 10-15 (6 pages).

Yan et al., (2018) Ion-selective asymmetric carbon electrodes for enhanced capacitive deionization. RSC Adv 8: 2490-2497 (8 pages).

(56) References Cited

OTHER PUBLICATIONS

Zhao et al., (2012) Time-dependent ion selectivity in capacitive charging of porous electrodes. Journal of Colloid and Interface Science 384(1): 38-44 (7 pages).

* cited by examiner

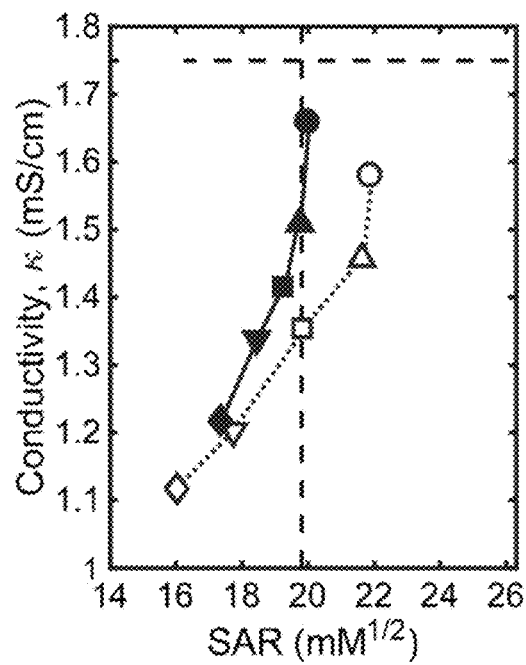
FIGURE 5D
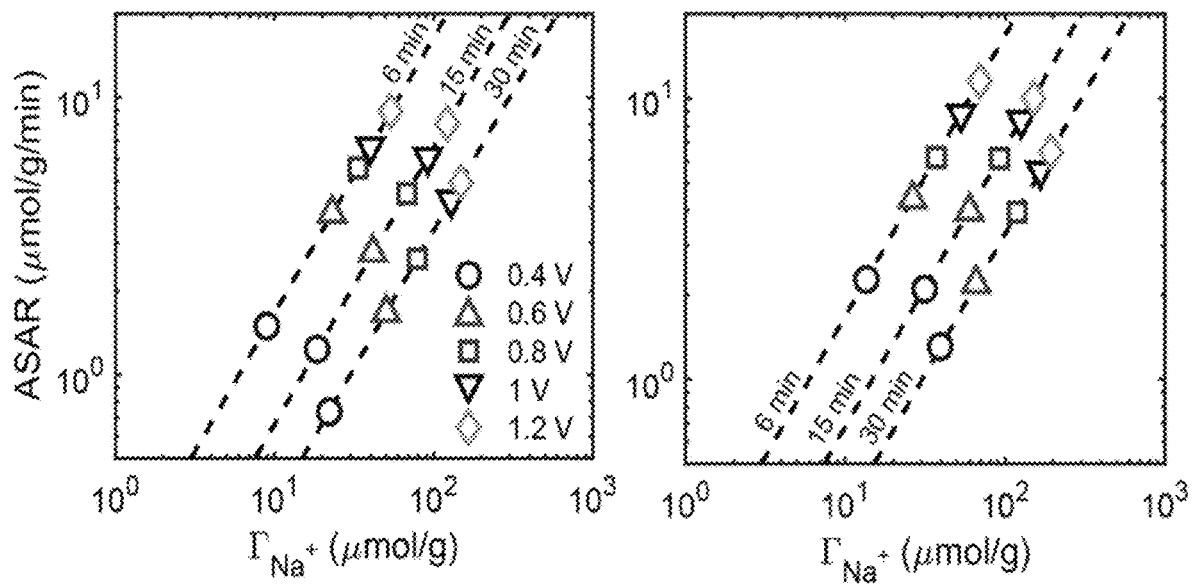
FIGURE 6A
FIGURE 6B

METHOD FOR SELECTIVE SEPARATION OF MONOVALENT IONIC SPECIES USING ELECTRODES FUNCTIONALIZED WITH SULFONIC GROUPS

FIELD OF THE INVENTION

The present invention relates to a method for selective separation of ionic species from an ionic solution, the method utilizing an electrode capacitor assembly comprising carbon electrodes modified with sulfonic groups.

BACKGROUND OF THE INVENTION

Selective water treatment, which removes more problematic ions preferentially over others, is an important goal towards next generation, energy efficient water treatment systems. For example, a common issue in agricultural irrigation water is high sodium content, which damages soil and reduces crop yields. Dominant contemporary water treatment technologies, which are membrane-based and include reverse osmosis (RO), filter out ionic species according to their size and ionic charge. Chemical precipitation uses materials that bind to specific compounds, which then precipitate out of water. In capacitive deionization (CDI), an applied electrical potential difference between two porous electrodes drives ions from the water into the pore spaces, where they are held electrostatically, thereby accomplishing desalination.

Capacitive deionization is a membraneless water treatment technology which is promising for selective ion removal. Typical CDI operation involves applying a constant voltage or current between two electrodes, which are often inexpensive and widely available activated carbons, in the presence of a feed stream. The electric field applied to the system causes the ions in the feed stream to electromigrate into the electrodes, where they are stored electrostatically in electric double layers (EDLs) formed in electrode nanopores. Once fully charged, the electrodes are regenerated electrically, by either short-circuiting or by reversing the applied current, and the discharged ions are released from the EDLs to form a concentrated brine waste stream. CDI has been identified as a highly promising emerging water treatment technology for brackish water desalination and ion selective separations, but a major bottleneck to widespread deployment is short electrode lifetime. A major cause of electrode degradation are Faradaic side-reactions which oxidize the anode and reduce dissolved oxygen at the cathode. In addition to activated carbons, alternate electrode materials rely on intercalation processes and conversion reactions to deionize water are currently under investigation. Relative to capacitive materials, these materials enable higher salt storage per charge but typically allow for less energy recovery, and generally suffer from higher electrode capital costs.

In activated carbon CDI electrodes, a number of ion properties have been found to influence selectivity, such as valence, hydrated size, hydration shell energy and structure, and bulk concentration. Numerical and computational methods such as molecular dynamics and Monte Carlo simulations are useful for deeply probing equilibrium nanopore selectivity mechanisms but are difficult to integrate into cell-level models capturing system dynamics. In contrast, the modified Donnan (mD) model for nanopore EDLs at equilibrium is widely used to model selectivity in CDI, as it is a relatively simple analytical formulation, can be fit readily to experimental data, and easy to integrate into a cell-level dynamic model. However, equilibrium models are insufficient to fully characterize dynamic selectivity processes, as it is well-known that during charging in competitive ionic environments, monovalent ions are initially preferred but are gradually exchanged with divalent ions in the electrode nanopores as the system approaches equilibrium. Seo et al. observed the dynamic replacement of $Na^+$ by $Mg^{2+}$ and $Ca^{2+}$ during a CDI cycle (Seo, S. J.; Jeon, H.; Lee, J. K.; Kim, G. Y.; Park, D.; Nojima, H.; Lee, J.; Moon, S. H. Investigation on Removal of Hardness Ions by Capacitive Deionization (CDI) for Water Softening Applications. Water Res. 2010, 44 (7), 2267-2275). Zhao et al. found $Na^+$ and $Ca^{2+}$ were initially stored in proportion to their bulk concentrations, yet $Ca^{2+}$ replaced $Na^+$ at longer times, and both ions approached equilibrium values predicted by modified Donnan theory after 5 hours charging (Zhao, R.; van Soestbergen, M.; Rijnaarts, H. H. M.; van der Wal, A.; Bazant, M. Z.; Biesheuvel, P. M. Time-Dependent Ion Selectivity in Capacitive Charging of Porous Electrodes. J. Colloid Interface Sci. 2012, 384 (1), 38-44), where other dynamic models were utilized for selectivity analysis considering other EDL models. Furthermore, Choi et al. observed short cycle time and high charging voltage increase monovalent ion removal relative to divalent ion removal (Choi, J.; Lee, H.; Hong, S. Capacitive Deionization (CDI) Integrated with Monovalent Cation Selective Membrane for Producing Divalent Cation-Rich Solution. Desalination 2016, 400, 38-46). Thus, connecting between equilibrium nanopore models and cell-level dynamic models is important to fully explore and synergize between parallel ion selectivity mechanisms in CDI.

WO 2020/049559 to some of the inventors of the present invention is directed to a method for selective separation of ionic species from an ionic solution based on said species' ionic hydrated size, the method comprising, inter alia, passing an ionic solution comprising ions having distinct hydrated sizes, through an electrode capacitor assembly comprising at least one carbon-based electrode which is modified with negatively or positively charged surface groups, including, sulfonate groups.

Electrode morphology and surface chemistry strongly influence selectivity in carbon electrodes. Techniques to enhance selectivity broadly follow two main approaches, physical tuning of nanopore size and chemical surface functionalization. Regarding the former approach, sufficiently narrow pores allow small ions to enter while larger ions are physically excluded, an effect known as ion sieving. Regarding the latter approach, chemically deposited surface functional groups have been shown to improve selective removal in CDI by enhancing size-based exclusion effects, and by binding preferentially to specific ions like $NO_3^-$ and $Pb^{2+}$. Furthermore, functional groups have been shown to increase salt adsorption capacity, cell charge efficiency, and long-term cycling stability. Surface functional groups behave as either acids or bases and exhibit either weak or strong dissociation behavior. While weak-acid groups have been shown to enhance selectivity, their dependence on local pH conditions can lead to performance greatly affected by variations in incoming feed pH (Hemmatifar, A.; Oyarzun, D. I.; Palko, J. W.; Hawks, S. A.; Stadermann, M.; Santiago, J. G.; Engineering, M. Equilibria Model for PH Variations and Ion Adsorption in Capacitive Deionization Electrodes. Water Res. 2017, 122, 387-397). Group stability is also critical, as significant loss of chemical surface charge in electrodes functionalized with weak-acid groups was observed after only a few charge-discharge cycles.

Sulfonation has been shown to improve charge efficiency (Min, B. H.; Choi, J.-H.; Jung, K. Y. Improved Capacitive Deionization of Sulfonated Carbon/Titania Hybrid Electrode. Electrochim. Acta 2018, 270, 543-551; Qian, B.; Wang, G.; Ling, Z.; Dong, Q.; Wu, T.; Zhang, X.; Qiu, J. Sulfonated Graphene as Cation-Selective Coating: A New Strategy for High-Performance Membrane Capacitive Deionization. Adv. Mater. Interfaces 2015, 2 (16), 1500372), adsorption capacity Jia, B.; Zou, L. Wettability and Its Influence on Graphene Nansoheets as Electrode Material for Capacitive Deionization. Chem. Phys. Lett. 2012, 548, 23-28; Lee, J.-Y.; Seo, S.-J.; Yun, S.-H.; Moon, S.-H. Preparation of Ion Exchanger Layered Electrodes for Advanced Membrane Capacitive Deionization (MCDI). Water Res. 2011, 45 (17), 5375-5380), and pore wettability (Yan, T.; Xu, B.; Zhang, J.; Shi, L.; Zhang, D. Ion-Selective Asymmetric Carbon Electrodes for Enhanced Capacitive Deionization. RSC Adv. 2018, 8 (5), 2490-2497; Park, H. R.; Choi, J.; Yang, S.; Kwak, S. J.; Jeon, S. Il; Han, M. H.; Kim, D. K. Surface-Modified Spherical Activated Carbon for High Carbon Loading and Its Desalting Performance in Flow-Electrode Capacitive Deionization. RSC Adv. 2016, 6 (74), 69720-69727), in lab-scale tests on feedwaters containing solely NaCl. However, the effect of sulfonic groups on ion selective removal, and its long-term stability upon CDI cell charge-discharge cycling has not been explored to the inventors' best knowledge.

There remains, therefore, an unmet need for CDI-based methods of monovalent ion separation, which would allow energy efficient operation and ensure long-term stability of the system components.

SUMMARY OF THE INVENTION

The present invention provides a method for selective separation of ionic species from an ionic solution. The method comprises, inter alia, passing an ionic solution comprising ions having distinct sizes (e.g., monovalent and polyvalent ions), through an electrode capacitor assembly comprising a carbon-based electrode which is functionalized with sulfonic surface groups. Specific operation parameters of the electrode capacitor assembly can be utilized in order to further enhance the selective monovalent ion removal from the ionic solution as compared to the removal of polyvalent species. The present method is therefore particularly useful in selective monovalent pollutant removal from water and other electrolytic streams, for example reducing relative sodium content in agricultural irrigation water. Advantageously, the selective separation method of the present invention provides stable long-term and energy efficient CDI operation.

The present invention is based in part on an unexpected finding that the use of carbon electrodes functionalized with sulfonic groups resulted in enhanced monovalent ion separation at relatively short full cycle times (FCT) and, in particular, short charging times. Due to the promising results obtained with short cycle times, the inventors extended the charging voltage window to further reduce sodium adsorption ratio (SAR) and conductivity of the treated water. It was surprisingly discovered that increasing the charging voltage to 1.5, 2, and 2.5 V with a 6 min FCT (which is 3 minutes charging time and about 0.5 scaled charging time) resulted in a SAR of 14 and conductivity of 0.81 mS/cm at 2.5 V, a decrease of 6 SAR units and a ~54% conductivity reduction from the feed solution. Furthermore, a $2^{nd}$ pass of product water from the 1.2 V and 6 min FCT experiment resulted in an even lower SAR of 13.3 and conductivity of 0.69 mS/cm. The inventors have demonstrated a CDI utilizing a sulfonated electrode, which could be operated for at least 1000 full charge-discharge cycles, which, to the inventors' best knowledge, is more than performed by any demonstrated CDI device up to date.

According to a first aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising: a first electrode and a second electrode, said electrodes comprising nanoporous carbon, wherein the first electrode is modified with sulfonate surface groups; and at least one flow channel for the passage of the solution; and (b) charging the electrode capacitor assembly: (1) at a voltage of at least about 1.5 V; and/or (2) for a scaled charging time of less than about 2, thereby providing enhanced adsorption of the positively charged monovalent ion in the first electrode as compared to the adsorption of the positively charged polyvalent ion.

According to certain embodiments, step (b) comprises charging the electrode capacitor assembly: (1) at a voltage of at least about 1 V and (2) for a scaled charging time of less than about 2.

According to certain embodiments, step (b) comprises charging the electrode capacitor assembly: (1) at a voltage of at least about 2.5 V; and/or (2) for a scaled charging time of less than about 0.5.

According to some embodiments, the method further comprises step (c) comprising discharging the electrode capacitor assembly at a voltage of about 0 V. In some embodiments, steps (b) and (c) are performed for the same duration of time.

According to some embodiments, steps (a) and (b) are repeated for at least about 1000 cycles. According to some embodiments, steps (a) and (b) are repeated until conductivity of the ionic solution reaches dynamic steady-state behavior.

According to some embodiments, the method is performed without flushing the electrode capacitor assembly, thereby further reducing conductivity and sodium adsorption ratio (SAR) of the ionic solution.

According to some embodiments, the method further comprises flushing the electrode capacitor assembly, thereby further increasing charge efficiency, ion adsorption, and productivity of the electrode capacitor assembly.

According to some embodiments, step (a) comprises continuously passing the ionic solution through the electrode capacitor assembly.

According to some embodiments, step (a) comprises passing the ionic solution with water productivity ranging from about 5 L/m² hr to about 500 L/m² hr.

According to some embodiments, the first electrode is further modified with sulfate surface groups.

According to some embodiments, the first electrode comprises negative chemical surface charges of between about −1.25 to −2.5 M at a pH range between about 3 and 10.

According to some embodiments, the first electrode has a specific nanopore volume of at least about 0.25 mL/g and/or a mean pore diameter ranging from about 0.5 to about 2 nm.

According to some embodiments, the nanoporous carbon is selected from the group consisting of activated carbon, carbon black, graphitic carbon, carbon fibers, carbon microfibers, carbon aerogel, fullerenic carbon, carbon nanotubes (CNTs), graphene, carbide, carbon onions, carbon paper, and any combination thereof.

In some exemplary embodiments, the first electrode comprises activated carbon which is modified with sulfonate surface groups and the second electrode comprises activated carbon, which is not chemically modified.

According to some embodiments, the positively charged monovalent ion is selected from the group consisting of $Na^+$, $Li^+$, $K^+$, $Au^+$, $Ag^+$, $Cu^+$, and combinations thereof. According to some embodiments, the positively charged polyvalent ion is selected from the group consisting of: $Ca^{2+}$, $Mg^{2+}$, $Fe^{2+}$, $Fe^{3+}$, $Pb^{2+}$, $Hg^{2+}$, $Cd^{2+}$, $In^{3+}$, $Ru^{3+}$, $Ru^{4+}$, $Zn^{2+}$, $Co^{2+}$, $Co^{3+}$, $Pt^{2+}$, $Pt^{4+}$, $Au^{3+}$, $Sn^{4+}$, $Sn^{2+}$, $Cu^{2+}$, and combinations thereof. According to certain embodiments, the positively charged monovalent ion is sodium ion ($Na^+$) and the positively charged polyvalent ion is calcium ion ($Ca^{2+}$).

According to some embodiments, the at least one flow channel is formed by at least one of a separator, membrane, gasket, spacer, and salt bridge. According to further embodiments, the electrode capacitor assembly further comprises a first current collector and a second current collector, wherein the first electrode is positioned between the first current collector and the flow channel, and the second electrode is positioned between the flow channel and the second current collector.

According to some embodiments, the first electrode, the second electrode, or both comprise a flowable nanoporous carbon electrode in the form of a suspension and/or a fluidized bed electrode.

According to some embodiments, the ionic solution flows into the flow channel directly through the first electrode, wherein the flow within the flow channel is configured orthogonally to an electrode surface plane.

According to some embodiments, the electrode capacitor assembly is in electrical communication with a power supply, wherein during operation said power supply is configured to apply electrical potential or to supply electric charge to the first and the second electrodes.

According to some embodiments, the electrode capacitor assembly is a part of an agricultural irrigation system, wastewater treatment system, brackish water desalination system or chemical reactor.

According to some embodiments, the water desalination system is configured in a form of a Capacitive Deionization (CDI) system or a Membrane Capacitive Deionization System (MCDI).

In another aspect, there is provided a method for selective separation of monovalent ionic species from an ionic solution, the method comprising: (a) passing the ionic solution comprising a positively charged monovalent ion and a positively charged polyvalent ion through an electrode capacitor assembly comprising: a first electrode and a second electrode, said electrodes comprising nanoporous carbon, wherein the first electrode is modified with sulfonate surface groups; and at least one flow channel for the passage of the solution; and (b) charging the electrode capacitor assembly for a charge time of less than about 10% of the time required to reach conductivity equilibrium, thereby providing enhanced adsorption of the positively charged monovalent ion in the first electrode as compared to the adsorption of the positively charged polyvalent ion.

It is to be understood that any combination of each of the aspects and the embodiments disclosed herein is explicitly encompassed within the disclosure of the present invention.

Further embodiments and the full scope of applicability of the present invention will become apparent from the detailed description given hereinafter. However, the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

FIGS. 5B-5D: Desalinated water quality for the P-P (labeled by full symbols) and S-P (labeled by empty symbols) electrode capacitor assemblies for FCT of 30 min (FIG. 5B), 15 min (FIG. 5C), and 6 min (FIG. 5D), obtained at different charging voltages (0.4V—labeled by circles, 0.6V—labeled by up-pointing triangles), 0.8V—labeled by squares, 1.0V—labeled by down-pointing triangles, and 1.2V—labeled by diamonds), wherein feed conditions are represented by dashed horizontal and vertical lines.

FIGS. 6A-6D: CDI Ragone (Kim-Yoon) plots at the limit cycle, no-flush operation obtained at different charging voltages (0.4V—labeled by circles, 0.6V—labeled by up-pointing triangles), 0.8V—labeled by squares, 1.0V—labeled by down-pointing triangles, and 1.2V—labeled by diamonds), including P-P $Na^+$ (FIG. 6A), S-P $Na^+$ (FIG. 6B), P-P $Ca^{2+}$ (FIG. 6C), and S-P $Ca^{2+}$ (FIG. 6D).

FIGS. 7A-7B: Performance comparison of no-flush and flush modes for extended voltage window operation in the S-P cell., wherein FIG. 7A shows output water SAR and conductivity (wherein 1.2V is labeled by diamonds, 1.5V is labeled by stars, 2V is labeled by snowflakes, and 2.5V is labeled by triangles), and FIG. 7B shows Coulombic efficiency (labeled by circles) and charge efficiencies (labeled by triangles), wherein empty symbols represent no-flush and full symbols represent flush conditions.

FIG. 8A shows energy input per unit output water, wherein its inset shows a fraction of energy use lost to resistive dissipation vs. separation ratio (marker color does not correspond to pH), and FIG. 8B shows thermodynamic efficiency.

DETAILED DESCRIPTION OF THE INVENTION

Figure 1A:
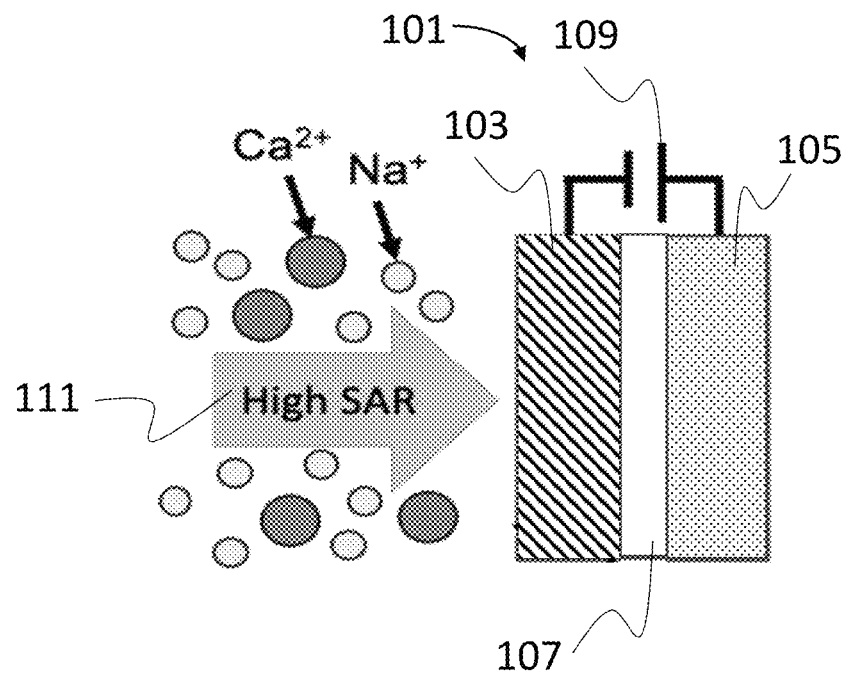
FIG. 1A: Schematic cross-sectional view of the electrode capacitor assembly and the ionic solution, in accordance with some embodiments of the invention.

The present invention provides a method for selective separation of ionic species from an ionic solution, preferably, monovalent ions, through an electrode capacitor assembly comprising a carbon-based electrode which is functionalized with sulfonic surface groups. The present invention is based in part on a breakthrough discovery that sulfonated electrodes can be advantageously utilized in monovalent selective CDI systems, which simultaneously reduce feed conductivity and SAR, while also being stable over 1000 charge-discharge cycles. It was shown by the inventors that using carbon electrodes functionalized with sulfonic groups enhances monovalent selectivity at short charging times over pristine electrodes, manifested by enhanced reduction to both the SAR and feedwater conductivity. Moreover, it was demonstrated that short charging times enable charging the cell at extended voltage windows (up to 2.5 V), well beyond those where electro-corrosion of the anode normally occurs. The high voltage operation was shown to lead to further reductions in conductivity and SAR, while maintaining a Coulombic efficiency greater than 90%, indicating a low rate of Faradaic side-reactions. Additionally, flush and no-flush CDI operation in the extended voltage range were compared, showing that despite gains in productivity and charge efficiency achieved with flushing, desalinated water SAR and conductivity increase relative to no-flush operation. Accordingly, the electrode capacitor assembly operating conditions can be further fine-tuned in order to achieve the desired parameters of the treated water or the treatment process efficiency. Furthermore, a cell with sulfonated cathode was cycled 1000 times at 1.2 V during charging, and showed no appreciable degradation, but rather achieved yet-lower effluent SAR with increasing cycle number.

In one aspect, there is provided a method for selective separation of ionic species from an ionic solution based on said species ionic hydrated size, the method comprising: (a) passing the ionic solution comprising at least a first positively charged ion and a second positively charged ion having distinct hydrated sizes, through an electrode capacitor assembly comprising a first electrode and a second electrode, said electrodes comprising carbon, wherein the first electrode is modified with sulfonate surface groups, and at least one flow channel for the passage of the solution; and (b) applying an electric potential or charge to the first and the second electrodes, thereby providing enhanced adsorption of the first positively charged ion in the first electrode as compared to the adsorption of the second positively charged ion.

In some embodiments, the first positively charged ion is a monovalent ion and the second positively charged ion is a polyvalent ion. Without wishing to being bound by theory or mechanism of action, it is contemplated that the surface and/or the nanoporous structure of the first electrode is able to adsorb more selectively monovalent ions (having a single charge) than polyvalent ions (having multiple charges), such as, for example, divalent or trivalent ions. In some related embodiments, the method of selective separation of ionic species from an ionic solution provides an ionic solution, which is enriched in positively charged polyvalent ions relatively to positively charged monovalent ions, following the separation process.

The terms "positively charged ion" and "cation" can be used interchangeably.

According to another aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising a first electrode and a second electrode, said electrodes comprising carbon, wherein the first electrode is modified with sulfonate surface groups, and at least one flow channel for the passage of the solution; and (b) charging the electrode capacitor assembly at a voltage of at least about 1.5 V, thereby providing enhanced adsorption of the positively charged monovalent ion in the first electrode as compared to the adsorption of the positively charged polyvalent ion.

According to yet another aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising a first electrode and a second electrode, said electrodes comprising carbon, wherein the first electrode is modified with sulfonate surface groups, and at least one flow channel for the passage of the solution; and (b) charging the electrode capacitor assembly for a full cycle time of less than about 15 min or for a scaled charging time of less than about 2, thereby providing enhanced adsorption of the positively charged monovalent ion in the first electrode as compared to the adsorption of the positively charged polyvalent ion.

According to still another aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising a first electrode and a second electrode, said electrodes comprising carbon, wherein the first electrode is modified with sulfonate surface groups, and at least one flow channel for the passage of the solution; and (b) charging the electrode capacitor assembly at a voltage of at least about 1.5 V for a full cycle time of less than about 15 min or for a scaled charging time of less than about 2, thereby providing enhanced adsorption of the positively charged monovalent ion in the first electrode as compared to the adsorption of the positively charged polyvalent ion.

According to yet another aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising: a first electrode and a second electrode, said electrodes comprising nanoporous carbon, wherein the first electrode is modified with sulfonate surface groups; and at least one flow channel for the passage of the solution; and (b) charging the electrode capacitor assembly: (1) at a voltage of at least about 1.5 V; and/or (2) for a scaled charging time of less than about 2, thereby providing enhanced adsorption of the positively charged monovalent ion in the first electrode as compared to the adsorption of the positively charged polyvalent ion.

In still another aspect, there is provided a method for selective separation of monovalent ionic species from an ionic solution, the method comprising: (a) passing the ionic solution comprising a positively charged monovalent ion and a positively charged polyvalent ion, through an electrode capacitor assembly comprising: a first electrode and a second electrode, said electrodes comprising nanoporous carbon, wherein the first electrode is modified with sulfonate surface groups; and at least one flow channel for the passage of the solution; and (b) charging the electrode capacitor assembly for a charge time of less than about 10% of the time required to reach conductivity equilibrium, thereby providing enhanced adsorption of the positively charged monovalent ion in the first electrode as compared to the adsorption of the positively charged polyvalent ion.

The term "sulfonate" group (also termed herein "sulfonic" group) refers to the group —O—S(=O)$_2$-R, where R can be selected from C, C—O, S, N, P, H, substituted or unsubstituted alkyl, aryl, alkenyl, alkynyl, and/or alkoxy moieties which may be linear, branched, or cyclic, and substituted or unsubstituted aryl and/or heteroaryl moieties.

The term "sulfonate surface group" refers to a sulfonate group present on the surface of the first electrode or, more particularly on the surface of the nanoporous carbon of the first electrode or on the nanoporous carbon sites, which are accessible to the ionic solution. The sulfonate groups can be bound to the surface of the first electrode via atoms present on the nanoporous carbon surface, such as, but not limited to carbon atoms (C), oxidized carbon atoms (C—O), sulfur atoms (S), nitrogen atoms (N), and (phosphorous atoms (P). In some embodiments, the sulfonate group is bound to the surface of the first electrode through R, which is selected from the group consisting of C, C—O, S, N, P, and combinations thereof. It is to be understood that when sulfonate groups are bound via oxidized carbon atoms (i.e., wherein R is C—O), the first electrode is modified by sulfate groups (—O—S(=O)$_2$—O—C). The term "sulfonate surface groups", as used herein, is therefore also meant to encompass sulfate surface groups. The atoms through which the sulfonate surface groups are attached to the electrode surface may depend on the purity levels of the nanoporous carbon. Preferably, the sulfonate groups are bound to the atoms, which are present on the nanoporous carbon surface, via covalent bonds.

It has been found by the inventors of the present invention, that while pristine carbon is mildly charged with a significant pH dependence of the measured chemical charge, indicating the presence of uniquely weak acidic (mostly carboxyl) and basic functional groups, the sulfonated nanoporous carbon is strongly negatively charged, indicating a significant strong acid behavior, which is stable in a wide pH range and at high operating voltages. Without wishing to being bound by theory or mechanism of action, it is contemplated that the stable negative charge of the sulfonated electrodes affords for the high efficiency of the present selective separation method, which employs short FCT and high charging voltage. Accordingly, in some embodiments, the first electrode is modified with sulfonate surface groups which are not pH dependent. According to further embodiments, the first electrode comprises negative chemical surface charges of at least about −1.25 M at a pH range between about 3 and 10. According to still further embodiments, the first electrode comprises negative chemical surface charges of at least about −2 M at a pH range between about 3 and 10. According to further embodiments, the first electrode comprises negative chemical surface charges between about −1.25 M to −2.5 M at a pH range between about 3 and 10.

In some embodiments, the first electrode does not contain a significant amount of carboxyl groups, as it is modified by sulfonate surface groups and/or sulfate surface groups. In further embodiments, the first electrode includes less than about 10% carboxyl groups out of the total concentration of its surface functional groups. In yet further embodiments, the first electrode includes less than about 5% carboxyl groups out of the total concentration of its surface functional groups. In still further embodiments, the first electrode includes less than about 1% carboxyl groups out of the total concentration of its surface functional groups.

In some embodiments, at least about 90% of the surface coverage by sulfonate surface groups and/or sulfate surface groups of the first electrode is retained following at least 100 cycles of operation of the electrode capacitor assembly.

The first electrode can be modified by sulfonate surface groups, for example, by exposing the nanoporous carbon to concentrated sulfuric acid ($H_2SO_4$). In some embodiments, the first electrode is modified by sulfonate surface groups by immersing the nanoporous carbon into 20% sulfuric acid for about 12-36 hours. In some embodiments, the modification process further includes exposing the treated carbon to an organic solvent, e.g., hexane, followed by exposing the carbon to deionized water. The temperature of the deionized water can range from about 0° C. to about 50° C. In some embodiments, the treated carbon is exposed to at least one portion of water, which has a temperature of about 0° C. and to at least one portion of water which has a temperature of about 25° C. The treated carbon can be exposed to each portion of the deionized water for from about 1 minute to about 5 hours.

According to some embodiments, the first electrode comprising carbon is sulfonated by immersing said electrode in sulfuric acid. According to some embodiments, the first electrode comprising carbon is sulfonated by immersing said electrode in nitric acid at a temperature ranging from about 20° C. to about 100° C. and then into sulfuric acid. In some embodiments, the temperature of nitric acid ranges from about 50° C. to about 100° C. In certain embodiments, the temperature of nitric acid is 80° C.

According to some embodiments, the first electrode comprising carbon is sulfonated with diazonium salt of sulfanilic acid, as detailed, for example, in U.S. Pat. No. 7,294,185, which is incorporated by reference herein in its entirety.

As disclosed hereinabove, the first and the second electrodes of the electrode capacitor assembly comprise carbon and have a pore structure comprising nanopores (also termed herein "nanoporous carbon"). The term "nanopores", as used herein, refers to pores with apertures up to around 100 nm. According to their size, the nanopores are classified as follows: Micropores-pores with diameter of less than 2 nm. Mesopores pores with diameter between 2 and 50 nm. Micropores-pores with diameter above 50 nm. The nanopores can be utilized as storage pores, for the adsorption of specific ionic species from the ionic solution.

As used herein, the terms "diameter" or "width" may be used interchangeably, and they refer to the length of the pore in the longest dimension thereof. The pores can have a shape selected from spherical, non-spherical, slit-shaped, polygon shapes, and combinations thereof.

In some embodiments, the nanopores of the first and/or the second electrodes have a mean pore diameter of below about 2 nm. In further embodiments, the nanopores have a pore diameter of below about 1.5 nm. In still further embodiments, the nanopores have a pore diameter of below about 1 nm. In some embodiments, the nanopores of the electrodes have a mean pore diameter ranging from about 0.5 nm to about 2 nm. In further embodiments, the nanopores of the electrodes have a mean pore diameter ranging from about 0.7 nm to about 2 nm.

The term "carbon", as used herein refers to different types of carbonaceous materials, including inter alia, activated carbon, carbon black, graphitic carbon, carbon fibers, carbon microfibers, carbon aerogel, carbon nanotubes (CNTs), graphene, carbide, carbon-based nanostructures such as fullerenic carbons or carbon onions, carbon paper and any combination thereof. The carbon fibers and/or microfibers can be woven into larger carbon filaments, fabrics, cloth or sheets. The carbon paper can comprise carbon microfibers woven into flat sheets. In certain embodiments, the first electrode and the second electrode comprise activated carbon. In further embodiments, the first electrode and the second electrode comprise activated carbon fibers. In still further embodiments, the first electrode and the second electrode are in a form of an activated carbon cloth.

According to some embodiments, the first electrode, the second electrode or both have a thickness ranging from about 10 μm to about 10 mm. In further embodiments, the first electrode, the second electrode or both have a thickness ranging from about 100 μm to about 1 mm. In still further embodiments, the first electrode, the second electrode or both have a thickness ranging from about 250 μm to about 750 μm. In certain embodiments, the first electrode, the second electrode or both have a thickness of about 600 μm.

The first electrode, the second electrode, or both can comprise intercalation and/or redox-active materials blended with carbon. As used herein, the term "intercalation" refers to a reversible insertion of cations or anions into sites within the solid electrode material. A non-limiting example of a suitable intercalation-active material is graphite, which allows intercalation of potassium ions and/or lithium ions. Non-carbonaceous intercalation materials can be selected from sodium manganese oxide (NMO), transition metal hexacyanoferrates (MHCFs), two-dimensional (2D) transition metal carbides, carbonitrides and nitrides (MXenes), or molybdenum sulfide. Non-limiting examples of redox-active electrode materials include silver metal (for the Ag/AgCl redox reaction), sodium iron phosphate, two-dimensional layered titanium disulfide, bismuth-BiOCl, and metal oxychlorides such as VOCl and FeOCl. Additional information on the redox active materials suitable for use in combination with carbon-based electrodes can be found in Suss, M. E., et al. "Water desalination with energy storage electrode materials." Joule 2.1 (2018): 10-15, hereby incorporated by reference in its entirety.

According to some embodiments, the first electrode and/or the second electrode has a specific nanopore volume of at least about 0.1 mL/g. According to further embodiments, the first electrode and/or the second electrode has a specific nanopore volume of at least about 0.25 mL/g. According to still further embodiments, the first electrode and/or the second electrode has a specific nanopore volume of at least about 0.5 mL/g. In some related embodiments, the specific nanopore volume is determined based on nitrogen absorption measurements.

In some embodiments, the first electrode and/or the second electrode has a specific nanopore volume ranging from about 0.1 mL/g to about 1 mL/g. In further embodiments, the first electrode and/or the second electrode has a specific nanopore volume ranging from about 0.25 mL/g to about 0.75 mL/g. In certain embodiments, the first electrode and/or the second electrode has a specific nanopore volume of about 0.5 mL/g. In some related embodiments, the specific nanopore volume is determined based on nitrogen absorption measurements.

In some embodiments, the first electrode and/or the second electrode has a surface area of above about 500 $m^2/g$, based on nitrogen absorption measurements. In further embodiments, the first electrode and/or the second electrode has a surface area of above about 1000 $m^2/g$, based on nitrogen absorption measurements.

According to some currently preferred embodiments, the first electrode operates as a cathode and the second electrode operates as an anode. The second electrode contains nanoporous carbon which can be either pristine (i.e., not chemically modified) or can be modified, for example, by positively charged surface groups.

In some exemplary embodiments, the first electrode comprises activated carbon which is modified with sulfonate surface groups and/or sulfate surface groups and the second electrode comprises activated carbon, which is not chemically modified.

According to some embodiments, the first electrode comprises activated carbon which is modified with sulfonate surface groups and/or sulfate surface groups and the second electrode comprises activated carbon, which is modified by positively charged surface groups. The positively charged surface groups can be selected from the group consisting of amine, amide, quaternary amine, ammonium, and combinations thereof.

The method of the present invention comprises step (b), which comprises charging the electrode capacitor assembly. In certain embodiments, step (b) comprises applying electric potential between the first and the second electrodes, wherein said potential induces charging of the capacitor electrode assembly.

According to some embodiments, the method further comprises step (c) comprising discharging the electrode capacitor assembly. In certain such embodiments, step (c) comprises applying electric potential between the first and the second electrodes, wherein said potential induces discharging of the capacitor electrode assembly. According to certain embodiments, step (c) comprises discharging the electrode capacitor assembly at a voltage of about 0 V. In some embodiments, steps (b) and (c) are performed for the same duration of time.

According to the various aspects and embodiments of the present invention, step (b) comprises charging the electrode capacitor assembly for a scaled charging time of less than about 2.

The term "scaled charging time", as used herein, refers to the duration of time during which the electrode capacitor assembly is charged in step (b), wherein said time is normalized by cell diffusion timescale. The term "cell diffusion timescale", as used herein refers to $D/l_e^2$, where D is diffusivity of the monovalent ion at infinite dilution and $l_e$ is thickness of the first electrode.

Accordingly, scaled charging time, $\hat{t}$ is:

$$\hat{t} = tD/l_e^2, \quad \text{Equation (1)}$$

where t is charging time.

Scaled charging time is a universal parameter, which accounts for the specific parameters of the electrode capacitor assembly (i.e., the first electrode thickness) and of the ionic solution (i.e., monovalent ion diffusivity). The charging time t required for performing step (b) in order to provide separation of the monovalent ions from the ionic solution according to the principles of the present invention can be easily calculated by a person skilled in the art based on Equation (1), wherein the scaled charging time is provided in the various aspects and embodiments of the present invention, the thickness of the first electrode can be measured and ion diffusivity values can be found, for example, in Petr Vanýsek: Ionic conductivity and diffusion at infinite dilution, Handbook of Chemistry and Physics, CRC Press, 1992/93 edition. Boca Raton, 1992. pp. (5-111)-(5-113).

According to some embodiments, step (b) comprises charging the electrode capacitor assembly for a scaled charging time of less than about 1.5. According to further embodiments, step (b) comprises charging the electrode capacitor assembly for a scaled charging time of less than about 1. According to further embodiments, step (b) comprises charging the electrode capacitor assembly for a scaled charging time of less than about 0.5.

According to some embodiments, step (b) comprises charging the electrode capacitor assembly for less than about 7.5 min. According to further embodiments, step (b) comprises charging the electrode capacitor assembly for less than about 6 min. According to still further embodiments, step (b) comprises charging the electrode capacitor assembly for less than about 5 min. According to yet further embodiments, step (b) comprises charging the electrode capacitor assembly for less than about 4 min. According to still further embodiments, step (b) comprises charging the electrode capacitor assembly for less than about 3 min. According to yet further embodiments, step (b) comprises charging the electrode capacitor assembly for less than about 2 min.

According to various aspects and embodiments of the present invention, step (b) comprises charging the electrode capacitor assembly for a charge time of less than about 10% of the time required to reach conductivity equilibrium. The term "conductivity equilibrium", as used herein, refers to, in some embodiments, a state wherein conductivity of the ionic solution, which passes through the electrode capacitor assembly during step (b) remains unchanged. In other words, the term "conductivity equilibrium" refers to a state wherein the conductivity of the ionic solution, which passes through the electrode capacitor assembly during step (b) is equal at an inlet of the electrode capacitor assembly and at an outlet thereof. Without wishing to being bound by theory or mechanism of action, it is contemplated that the charging times, which are significantly shorter than the time required for reaching the conductivity equilibrium afford for the monovalent selectivity of the present separation method.

According to some embodiments, step (b) comprises charging the electrode capacitor assembly for a charge time of less than about 5% of the time required to reach conductivity equilibrium. According to further embodiments, step (b) comprises charging the electrode capacitor assembly for a charge time of less than about 1% of the time required to reach conductivity equilibrium.

The step of charging is referred to as a half cycle. The step of discharging is also referred to as a half cycle. The step of charging and subsequent discharging is referred to as a full cycle. The terms "full cycle time" or "FTC" refer to the time required to perform said full cycle (i.e., both charging and discharging). Typically, the charging time is equal to discharging time. In certain such embodiments, if the charging is performed, for example, for 3 minutes, the FCT is 6 minutes.

According to some embodiments, step (b) comprises charging the electrode capacitor assembly for a full cycle time of less than about 15 min. According to further embodiments, step (b) comprises charging the electrode capacitor assembly for a full cycle time of less than about 12 min. According to still further embodiments, step (b) comprises charging the electrode capacitor assembly for a full cycle time of less than about 10 min. According to yet further embodiments, step (b) comprises charging the electrode capacitor assembly for a full cycle time of less than about 8 min. According to still further embodiments, step (b) comprises charging the electrode capacitor assembly for a full cycle time of less than about 6 min. According to yet further embodiments, step (b) comprises charging the electrode capacitor assembly for a full cycle time of less than about 4 min.

In further embodiments, step (b) comprises charging the electrode capacitor assembly at a voltage of above about 0.8V. In yet further embodiments, step (b) comprises charging the electrode capacitor assembly at a voltage of above about 1V. In still further embodiments, step (b) comprises charging the electrode capacitor assembly at a voltage of above about 1.2V.

According to some embodiments, step (b) comprises charging the electrode capacitor assembly at a voltage of at least about 1.5 V. According to further embodiments, step (b) comprises charging the electrode capacitor assembly at a voltage of at least about 1.75 V. According to still further embodiments, step (b) comprises charging the electrode capacitor assembly at a voltage of at least about 2.0 V. According to yet further embodiments, step (b) comprises charging the electrode capacitor assembly at a voltage of at least about 2.25 V. According to still further embodiments, step (b) comprises charging the electrode capacitor assembly at a voltage of at least about 2.5 V. According to yet further embodiments, step (b) comprises charging the electrode capacitor assembly at a voltage of at least about 2.75 V.

According to certain embodiments, step (b) comprises charging the electrode capacitor assembly at a voltage of at least about 0.8 V for a scaled charging time of less than about 2. According to certain embodiments, step (b) comprises charging the electrode capacitor assembly at a voltage of at least about 1.0 V for a scaled charging time of less than about 2. According to certain embodiments, step (b) comprises charging the electrode capacitor assembly at a voltage of at least about 1.2 V for a scaled charging time of less than about 2. According to certain embodiments, step (b) comprises charging the electrode capacitor assembly at a voltage of at least about 1.5 V for a scaled charging time of less than about 2. According to certain embodiments, step (b) comprises charging the electrode capacitor assembly at a voltage of at least about 1.75 V for a scaled charging time of less than about 2. According to certain embodiments, step (b) comprises charging the electrode capacitor assembly at a voltage of at least about 2.0 V for a scaled charging time of less than about 2. According to certain embodiments, step (b) comprises charging the electrode capacitor assembly at a voltage of at least about 2.25 V for a scaled charging time of less than about 2. According to certain embodiments, step (b) comprises charging the electrode capacitor assembly at a voltage of at least about 2.5 V for a scaled charging time of less than about 2.

According to certain embodiments, step (b) comprises charging the electrode capacitor assembly at a voltage of at least about 0.8 V for a scaled charging time of less than about 0.5. According to certain embodiments, step (b) comprises charging the electrode capacitor assembly at a voltage of at least about 1.0 V for a scaled charging time of less than about 0.5. According to certain embodiments, step (b) comprises charging the electrode capacitor assembly at a voltage of at least about 1.2 V for a scaled charging time of less than about 0.5. According to certain embodiments, step (b) comprises charging the electrode capacitor assembly at a voltage of at least about 1.5 V for a scaled charging time of less than about 0.5. According to certain embodiments, step (b) comprises charging the electrode capacitor assembly at a voltage of at least about 1.75 V for a scaled charging time of less than about 0.5. According to certain embodiments, step (b) comprises charging the electrode capacitor assembly at a voltage of at least about 2.0 V for a scaled charging time of less than about 0.5. According to certain embodiments, step (b) comprises charging the electrode capacitor assembly at a voltage of at least about 2.25 V for a scaled charging time of less than about 0.5. According to certain embodiments, step (b) comprises charging the electrode capacitor assembly at a voltage of at least about 2.5 V for a scaled charging time of less than about 0.5.

It should be understood that unless otherwise specified, the values of potentials or voltage indicated throughout the specification and in the claims refer to the potential of the first electrode measured versus the second electrode, or to the potential of the second electrode measured versus the potential of the first electrode, for a single electrode capacitor assembly. If the electrode capacitor assembly is configured in a stack configuration, having multiple cells connected in series or in parallel, the indicated potential or voltage values refer to a single cell. The overall potential applied to the entire stack can be calculated as known in the art depending on how the cell are connected. The term "cell", as used herein, refers to the electrode capacitor assembly comprising two electrodes and a flow channel therebetween.

The method of the present invention comprises step (a), which comprises passing the ionic solution comprising a positively charged monovalent ion and a positively charged polyvalent ion through the electrode capacitor assembly. The ionic solution can be stored in a suitable reservoir, such as, for example, feedwater tank (also termed herein "feed tank") and flown into the electrode capacitor assembly therefrom. In some embodiments, the ionic solution is flown into the electrode capacitor assembly from a reservoir in which the ionic solution to be treated is naturally present.

In some embodiments, the electrode capacitor assembly has an inlet and an outlet. In further embodiments, the ionic solution enters the electrode capacitor assembly at the inlet and exits the electrode capacitor assembly at the outlet thereof.

According to some embodiments, the ionic solution is first passed through the first electrode and then through the second electrode.

According to some embodiments, steps (a) and (b) are performed simultaneously. In certain such embodiments, the ionic solution is passed through the electrode capacitor assembly during the charging step. According to additional embodiments, the ionic solution is passed through the electrode capacitor assembly during the discharging step.

According to some embodiments, the method comprises continuous passing of the ionic solution through the electrode capacitor assembly while the electric potential is applied to the electrode capacitor assembly. The term "continuous", as used herein, refers in some embodiments to a constant flow rate at which the ionic solution is passed into the electrode capacitor assembly.

According to some embodiments, step (a) comprises passing the ionic solution with water productivity ranging from about ranging from about 5 L/m$^2$ hr to about 500 L/m$^2$ hr. In further embodiments, step (a) comprises passing the ionic solution with water productivity ranging from about 10 L/m$^2$ hr to about 250 L/m$^2$ hr. According to still further embodiments, step (a) comprises passing the ionic solution with water productivity ranging from about 20 L/m$^2$ hr to about 100 L/m$^2$ hr. The term "water productivity", as used herein, refers to the flow rate of the ionic solution divided by cross-sectional electrode area through which the ionic solution passes.

According to some embodiments, step (a) comprises passing the ionic solution at a flow rate ranging from about 0.1 mL/min to about 10 mL/min. In further embodiments, step (a) comprises passing the ionic solution at a flow rate ranging from about 0.25 mL/min to about 7.5 mL/min. According to still further embodiments, step (a) comprises passing the ionic solution at a flow rate ranging from about 0.5 mL/min to about 5 mL/min. In certain embodiments, step (a) comprises passing the ionic solution at a flow rate of about 1 mL/min.

In additional embodiments, the term "continuous" refers to recirculation of the ionic solution into the ionic solution reservoir, following its flow from the capacitor electrode assembly. The ionic solution can be recirculated two, three, five, ten or more times.

In order to treat large volumes of the ionic solution and or the provide the desired degree of separation of the monovalent ions from the ionic solution, steps (a) and (b) can be repeated as many times as needed. According to some embodiments, steps (a) and (b) are repeated for at least about 50 full cycles of charge and discharge. According to further embodiments, steps (a) and (b) are repeated for at least about 100 full cycles of charge and discharge. According to still further embodiments, steps (a) and (b) are repeated for at least about 500 full cycles of charge and discharge. According to yet further embodiments, steps (a) and (b) are repeated for at least about 1000 full cycles of charge and discharge. According to still further embodiments, steps (a) and (b) are repeated until conductivity of the ionic solution reaches dynamic steady-state behavior. According to additional embodiments, step (c) is repeated for at least 50, 100, 500, or 1000 full cycles or until the conductivity of the ionic solution reaches dynamic steady-state behavior.

The term "dynamic steady state", as used herein, refers to a state which is reached after multiple cycles of charge and discharge, wherein the measured ion adsorption during a first half cycle is equal to the ion desorption during a second half cycle of the same full cycle.

According to some embodiments, the method further comprises flushing the electrode capacitor assembly. Without wishing to being bound by theory or mechanism of action, it is contemplated that the flush step further increases charge efficiency, ion adsorption, and productivity of the electrode capacitor assembly as compared to a method, which does not include flushing.

According to some embodiments, the method is performed without flushing the electrode capacitor assembly. Without wishing to being bound by theory or mechanism of action, it is contemplated that the lack of the flush step further reduces conductivity and sodium adsorption ratio (SAR) of the ionic solution as compared to a method which includes flushing.

The terms "flush", "flushing", and "flush step", which can be used interchangeably, refer to a step of passing the ionic solution through the electrode capacitor assembly after each half cycle (i.e., after charging (step (b)) and after discharging (step (c)), wherein the electrode capacitor assembly is held at a current of 0 Amp. According to some embodiments, the flushing step is performed for a time period of from about 10 seconds to about 5 minutes. In further embodiments, the flushing step is performed for a time period of from about 30 seconds to about 3 minutes. In some exemplary embodiments, the flushing step is performed for about 1 min.

According to some embodiments, the flush step comprises passing the ionic solution through the electrode capacitor assembly with water productivity ranging from about 25 $L/m^2$ hr to about 2,500 $L/m^2$ hr. In further embodiments, the flush step comprises passing the ionic solution through the electrode capacitor assembly with water productivity ranging from about 50 $L/m^2$ hr to about 500 $L/m^2$ hr.

According to some embodiments, the flush step comprises passing the ionic solution through the electrode capacitor assembly at a flow rate of from about 0.5 mL/min to about 50 mL/min. In further embodiments, the flush step comprises passing the ionic solution through the electrode capacitor assembly at a flow rate of from about 1 mL/min to about 10 mL/min. In some exemplary embodiments, the flush step comprises passing the ionic solution through the electrode capacitor assembly at a flow rate of about 5 mL/min.

The capacitor electrode assembly can be operated in a single-pass charge mode, wherein the ionic stream which exits the capacitor electrode assembly is stored in a separate container and not recycled back to the feed tank. The capacitor electrode assembly can be operated in a batch mode, wherein the ionic stream which exits the capacitor electrode assembly is recycled back to the feed tank. The capacitor electrode assembly can be operated in multiple passes mode, wherein the ionic stream which exits the capacitor electrode assembly after conductivity of the ionic solution reaches dynamic steady-state behavior is recycled back to the feed tank and steps (a) and (b) are repeated.

In some embodiments, the ionic solution which can be selectively deionized by the method of the invention includes monovalent ions. In further embodiments, said solution comprises polyvalent ions. In some embodiments, the ionic solution of the present invention comprises ionic species, which are selected from the group consisting of $Li^+$, $Na^+$, $K^+$, $Mg^{2+}$, $Ca^{2+}$, $Fe^{2+}$, $Fe^{3+}$, $CrO_4^{2-}$, $Pb^{2+}$, $Hg^{2+}$, $Cd^{2+}$, $In^{3+}$, $Ru^{3+}$, $Ru^{4+}$, $Zn^{2+}$, $Co^{2+}$, $Co^{3+}$, $Pt^{2+}$, $Pt^{4+}$, $Au^+$, $Au^{3+}$, $Ag^+$, $Sn^{4+}$, $Sn^{2+}$, $Cu^{2+}$, and combinations thereof. Each possibility represents a separate embodiment of the invention.

According to some embodiments, the positively charged monovalent ion is selected from the group consisting of: $Na^+$, $Li^+$, $K^+$, $Au^+$, $Ag^+$, $Cu^+$, and combinations thereof. According to some embodiments, the positively charged polyvalent ion is selected from the group consisting of: $Ca^{2+}$, $Mg^{2+}$, $Fe^{2+}$, $Fe^{3+}$, $Pb^{2+}$, $Hg^{2+}$, $Cd^{2+}$, $In^{3+}$, $Ru^{3+}$, $Ru^{4+}$, $Zn^{2+}$, $Co^{2+}$, $Co^{3+}$, $Pt^{2+}$, $Pt^{4+}$, $Au^{3+}$, $Sn^{4+}$, $Sn^{2+}$, $Cu^{2+}$, and combinations thereof. According to certain embodiments, the positively charged monovalent ion is sodium ion ($Na^+$) and the positively charged polyvalent ion is calcium ion ($Ca^{2+}$).

In some embodiments, the ionic solution further comprises water or an organic solvent. In some exemplary embodiments, the ionic solution is an aqueous solution. The aqueous based solution can further include a buffer, osmolarity agent or ionic strength modifier.

In some embodiments, the ionic solution comprises glucose.

In some embodiments, the ionic solution is organic based. Non-limiting examples of suitable organic solvents include propylene carbonate, propylene glycol, acetonitrile, tetrahydrofuran, diethyl carbonate, γ-butyrolactone, and combinations thereof.

The method of the present invention is particularly suitable for the treatment of agricultural water designated for irrigation, as it allows to reduce the concentration of the positively charged monovalent ions such as sodium ions, while maintaining the desired concentration of the positively charged polyvalent ions such as calcium ions.

In some embodiments, the at least one flow channel for the passage of the solution separates the first and the second electrodes. In some embodiments, the at least one flow channel is formed by at least one of a separator, membrane, gasket, spacer, and salt bridge.

The electrode capacitor assembly can further comprise a first current collector and a second current collector. In further embodiments, the first electrode is positioned between the first current collector and the flow channel, and the second electrode is positioned between the flow channel and the second current collector.

The electrode capacitor assembly of the present invention can be configured in various cell geometries, as known in the art. In some embodiments, the electrode capacitor assembly is operated in a flow-by mode, wherein the electrode capacitor assembly is configured in a stack configuration, having a spacer separating the electrodes, wherein the ionic solution flows through the spacer in a horizontal manner, parallel to the electrodes. In further embodiments, the first electrode is positioned between said first current collector and the flow channel, and the second electrode is positioned between the flow channel and said second current collector.

In some embodiments, the electrode capacitor assembly is operated in a flow-by mode utilizing flow-electrodes. In such embodiments, the electrode capacitor assembly comprises at least two electrode channels, wherein each electrode channel comprises a flowable carbon electrode in the form of a suspension (slurry) and/or a fluidized bed electrode. The at least two electrode channels are in ionic contact with at least two ion-permeable membranes, which separate the carbon electrodes from the ionic solution flowing through the flow channel. Each flowable carbon electrode flows through the electrode channel, which separate the membranes from the respective current collectors.

In some embodiments, the electrode capacitor assembly is operated in a flow-through mode, wherein the ionic solution flows into the flow channel directly through the electrodes, wherein the flow channel is configured orthogonally to the electrodes. In certain such embodiments, the ionic solution flows through the interconnected pores of the porous carbon electrodes. As used herein, the term "interconnected pores" refers to a nanoporous carbon material having an open porosity, wherein the pores of the material are connected, thus enabling the passage of a fluid from the bulk to the internal volume of the pores within the carbon material.

According to some embodiments, the electrode capacitor assembly of the present invention as presented herein above is in electrical communication with a power supply, wherein during operation said power supply is configured to apply electrical potential or to draw or supply charge to the first and the second electrodes.

Reference is now made to FIG. 1A, which schematically represents a cross-sectional view of capacitor electrode assembly 101, for use in the method of selective separation of ionic species, according to some embodiments of the invention. Capacitor electrode assembly 101 includes first electrode (cathode) 103, which contains nanoporous carbon modified with sulfonate surface groups. Capacitor electrode assembly 101 further includes second electrode (anode) 105, which contains carbon, which can be pristine or modified with positively charged surface groups. Capacitor electrode assembly 101 further includes flow channel 107 disposed between first electrode 103 and second electrode 105. First electrode 103 and second electrode 105 are connected to power supply 109.

Electrode capacitor assembly 101 is operated in a flow-through mode, wherein ionic solution 111 containing positively charged polyvalent ions ($Ca^{2+}$) and positively charged monovalent ions ($Na^+$) enters capacitor electrode assembly 101 through first electrode 103, flows through flow channel 107 and exits capacitor electrode assembly 101 through second electrode 105, wherein the flow is configured orthogonally to the electrodes surface plane.

Figure 1B:
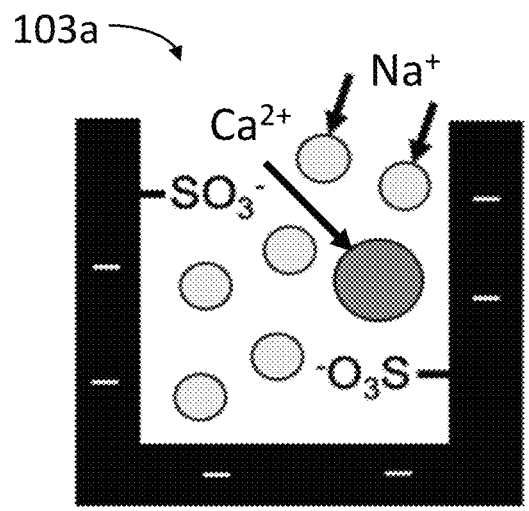
FIG. 1B: Schematic cross-sectional view of the macroscopic structure of the carbon electrode modified with sulfonic groups of the electrode capacitor assembly of FIG. 1A, during operation.

Reference is now made to FIG. 1B, which schematically represents the cross-sectional view of the nanopore 103a of first electrode 103 of electrode capacitor assembly 101, as presented in FIG. 1A, according to some embodiments of the invention. Nanopore 103a contains carbon modified with sulfonate surface groups, thereby having negative chemical concentration and being negatively charged. Due to the stable negative surface charge of nanopore 103a and operational conditions of electrode capacitor assembly 101 as detailed hereinabove, including short charge times and high charge voltages, adsorption of the $Na^+$ ions within nanopore 103a is enhanced as compared to the adsorption of $Ca^{2+}$ ions.

According to some embodiments, the electrode capacitor assembly is incorporated within an agricultural irrigation water treatment system. In some embodiments, said system is configured in a form of Capacitive Deionization (CDI) system or a Membrane Capacitive Deionization System (MCDI). The CDI and/or MCDI systems can further be used in additional applications, including, inter alia, brackish water desalination system, water softening, wastewater treatment, and organic stream remediation. The method of the present invention can therefore be used to selectively separate ions in ionic solutions intended for agricultural or consumer purposes. Selective removal of specific ion species afforded by the method of the present invention further simplifies and increases efficiency of the capacitive deionization process for water treatment.

Figure 1C:
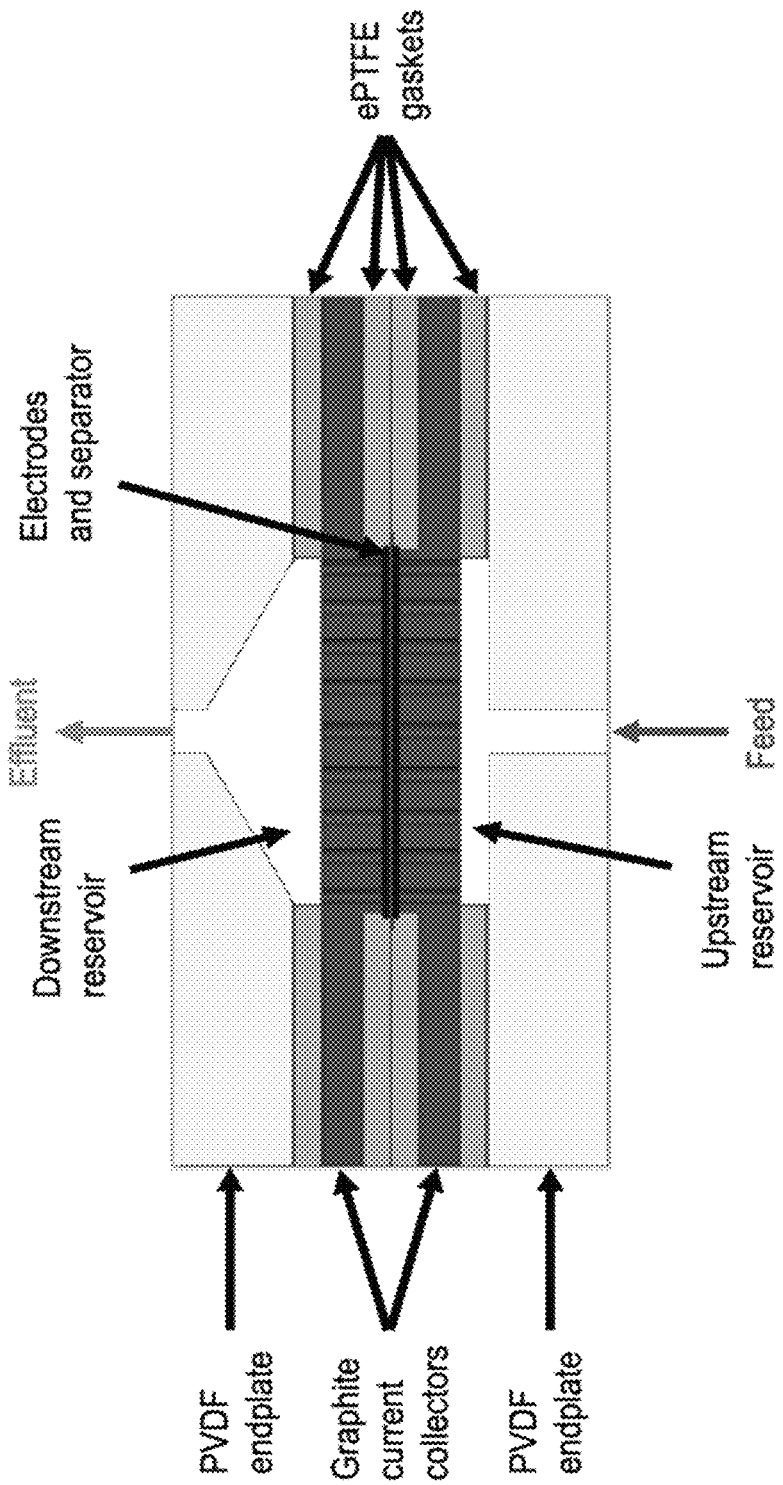
FIG. 1C: Schematic cross-sectional view of the CDI system comprising the electrode capacitor assembly of FIG. 1A, in accordance with some embodiments of the invention.

In some embodiments, the system is a membraneless CDI. In some related embodiments, the system comprises an electrode capacitor assembly comprising a first electrode and a second electrode electronically isolated by a separator, and two current collectors which contact the posterior side of each electrode. In further embodiments, the current collectors are designed to allow passage of the ionic solution therethrough, e.g., by containing through holes. The electrode capacitor assembly can be enclosed within an electrically insulating casing having an inlet and an outlet for the flow of the ionic solution, being in fluid flow connection with the current collectors. The electrode capacitor assembly can further include one or more gaskets in order to provide sealing. Schematic representation of the electrode capacitor assembly of the membraneless CDI system is shown in FIG. 1C. The system can further include a feed tank, a pump, and a power supply. The combination of the simple design of the CDI and the easy to implement method of the present invention provide a cost- and energy-efficient solution for water treatment applications in which selective separation of monovalent ionic species is required.

In some embodiments, the flow channel comprises at least two ion-permeable membranes. The term "Membrane Capacitive Deionization" or "MCDI" as used herein refers to a modified form of CDI, which employ the utilization of at least two ion exchange membranes, which separate the electrodes from the ionic solution, and enable the passage of ions having specific charge from the solution to the electrode.

In further embodiments, the CDI and or MCDI system further comprises a feed tank, a feed pump, treated solution tank, and/or a waste tank. The pump is configured to induce the flow of the ionic solution from the feed tank into the electrode capacitor assembly, and from the electrode capacitor assembly into the treated solution tank or to the feed tank.

As used herein and in the appended claims the singular forms "a", "an," and "the" include plural references unless the content clearly dictates otherwise. It should be noted that the term "and" or the term "or" is generally employed in its sense including "and/or" unless the content clearly dictates otherwise. Throughout the description and claims of this specification, the words "comprise" and "contain" and variations of the words, for example "comprising" and "comprises", mean "including but not limited to", and are not intended to (and do not) exclude other moieties, additives, components, integers or steps.

As used herein, the term "about", when referring to a measurable value such as an amount, a temporal duration, and the like, is meant to encompass variations of +/−15%, preferably +/−10%, more preferably +/−5%, even more preferably +/−1%, and still more preferably +/−0.1% from the specified value, as such variations are appropriate to perform the disclosed methods.

As used herein, the term "multiple", means more than one, such as, but not limited to, two, three, five, ten, fifty, hundred, or more.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—Electrode Preparation

The pristine electrode material used was activated carbon cloth (ACC-5092-15, Kynol Europa GmbH, Germany) with ~600 μm thickness and ~1400 $m^2$/g surface area, with the latter determined from $N_2$ gas sorption and BET analysis. This material was characterized in several previous CDI works, e.g., in Guyes, E. N.; Malka, T.; Suss, M. E. Enhancing the Ion-Size-Based Selectivity of Capacitive Deionization Electrodes. Environ. Sci. Technol. 2019, 53, 8447-8454. The pristine electrode material was used as a starting material for the preparation of the sulfonated electrodes, as well as for comparison purposes.

The sulfonated electrode material was prepared as follows. Pristine carbon cloth weighing about 4 g was inserted into a flask containing at least 28 mL of 20% sulfuric acid ($H_2SO_4$). The flask was then closed with a stopper. After 24 hours, the cloth was removed from the flask and soaked with an excess of hexane for 5-10 minutes. The cloth was then transferred to a beaker with deionized water at 0° C. and soaked for 5-10 minutes. The cloth was then soaked in deionized (DI) water at room temperature three times, each time for 30 minutes, then dried in air at 80° C. for 12 hours.

Figure 2A:
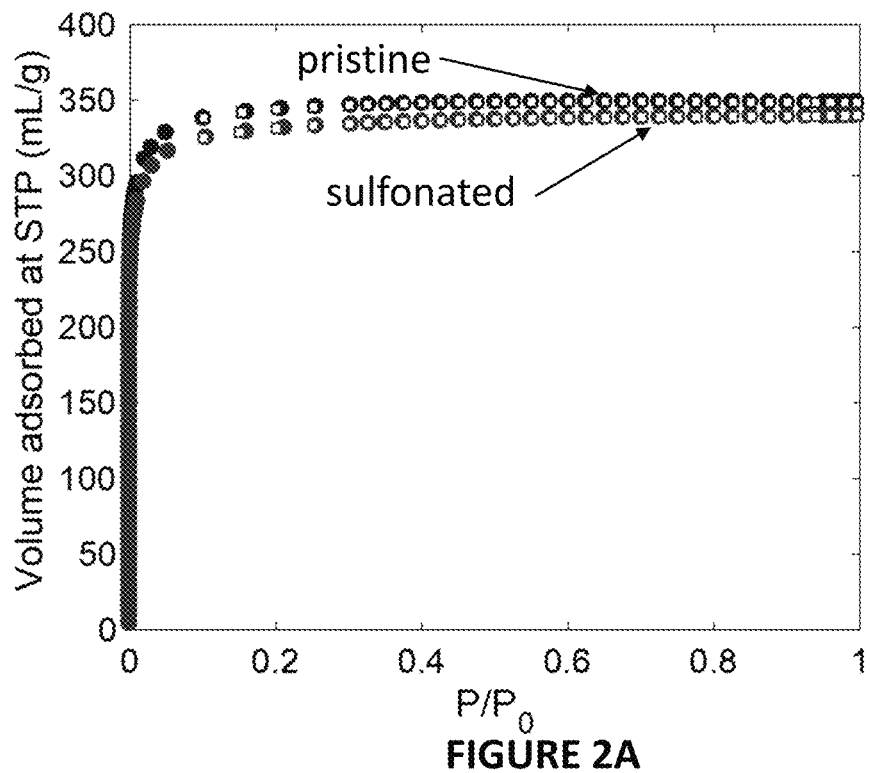
FIG. 2A: Nitrogen gas sorption isotherms for pristine and sulfonated electrodes.
Figure 2B:
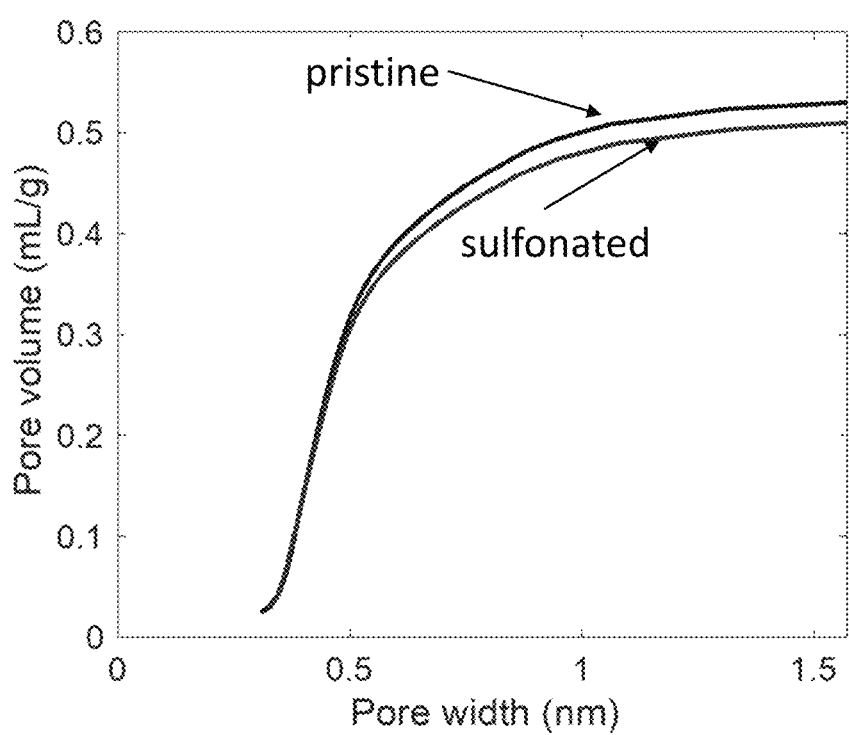
FIG. 2B: Horvath-Kawazoe pore volume distributions for slit pore geometry.

The pristine and sulfonated materials were cut into electrode squares with a cross-sectional area of 6.25 cm². All electrodes were rinsed with deionized (DI) water (18.2 MΩ, Synergy Water Purification System, Merck Millipore KGaA), dried at 80° C. for 3 hr, then immediately weighed, as the carbon is hygroscopic. The specific nanopore volume of the pristine and sulfonated materials is approximately 0.53 and 0.51 mL/g, respectively, as determined from the $N_2$ adsorption data (FIGS. 2A-2B).

Example 2—Electrode Characterization

Fourier Transform Infrared Spectroscopy (FTIR)

The pristine and sulfonated materials were characterized with FTIR to characterize functional group bonds. Potassium bromide (KBr) is dried in a furnace before usage, then about 400 mg is taken and ground into powder before mixing with about 0.05 mg of electrode. Approximately 150 mg of the well-mixed powder is transferred to a KBr pellet die and pressed with 5 tons of force for about 1 minute. The prepared KBr pellet is then tested with FTIR (Bruker Tensor 27, Bruker Corporation, USA) using the transmission mode. Raw data is smoothed, baseline-calibrated and normalized with the peak at 804 cm$^{-1}$.

Figure 3:
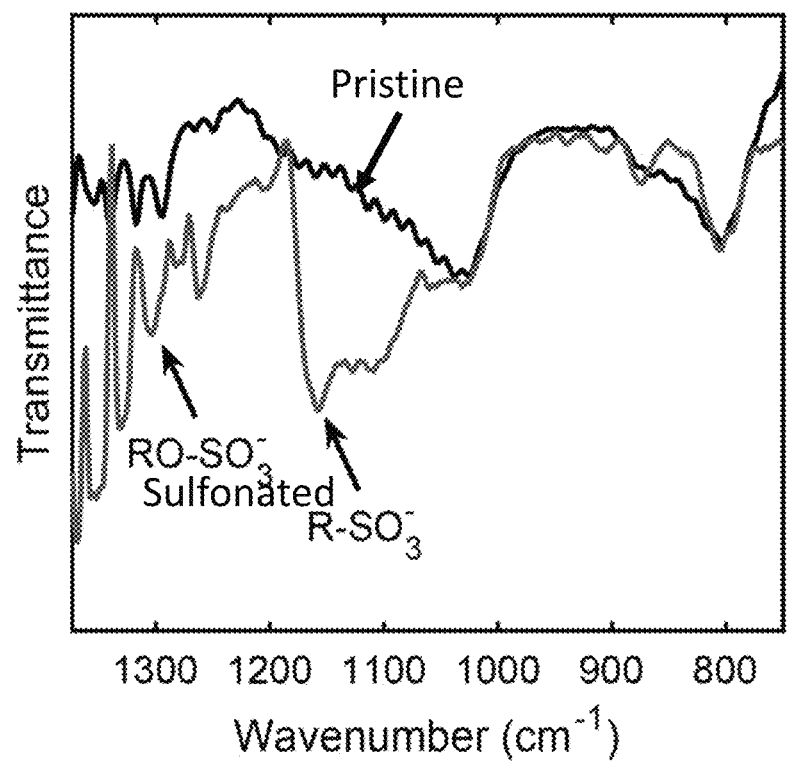
FIG. 3: Measured Transmission Fourier Transform Infrared (FTIR) spectra for a pristine, as-received electrode and an electrode after sulfonation.

Transmission Fourier Transform Infrared (FTIR) spectra of the pristine and sulfonated electrode materials are shown in FIG. 3. The sulfonated electrode spectrum displays distinctive peaks at 1162 and 1157 cm$^{-1}$, corresponding to the R-$SO_3^-$ group, and multiple peaks in the band 1315-1220 cm$^{-1}$, corresponding to the RO-$SO_3^-$ group, thus confirming the presence of sulfonic functional groups on the electrode surface.

Titrations

Figure 4A:
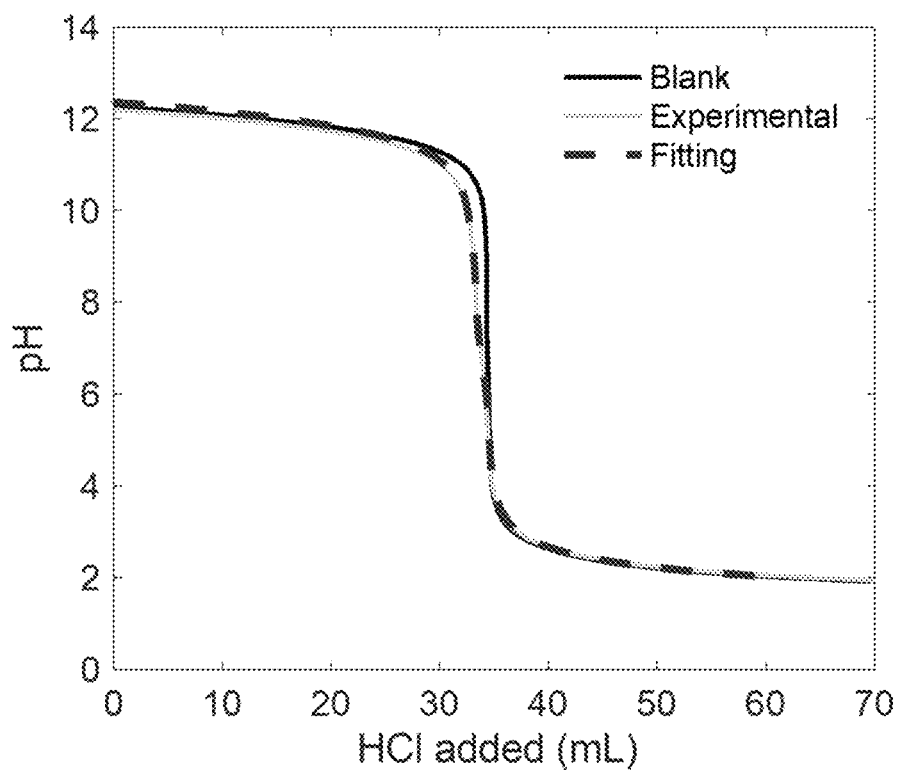
FIGS. 4A-4B: Experimental and fitted titration curves for the pristine electrode (FIG. 4A) and the sulfonated electrode (FIG. 4B), wherein grey solid lines represent experimental data, black solid lines represent experimental blank titration, and dashed lines represent fitting.
Figure 4B:
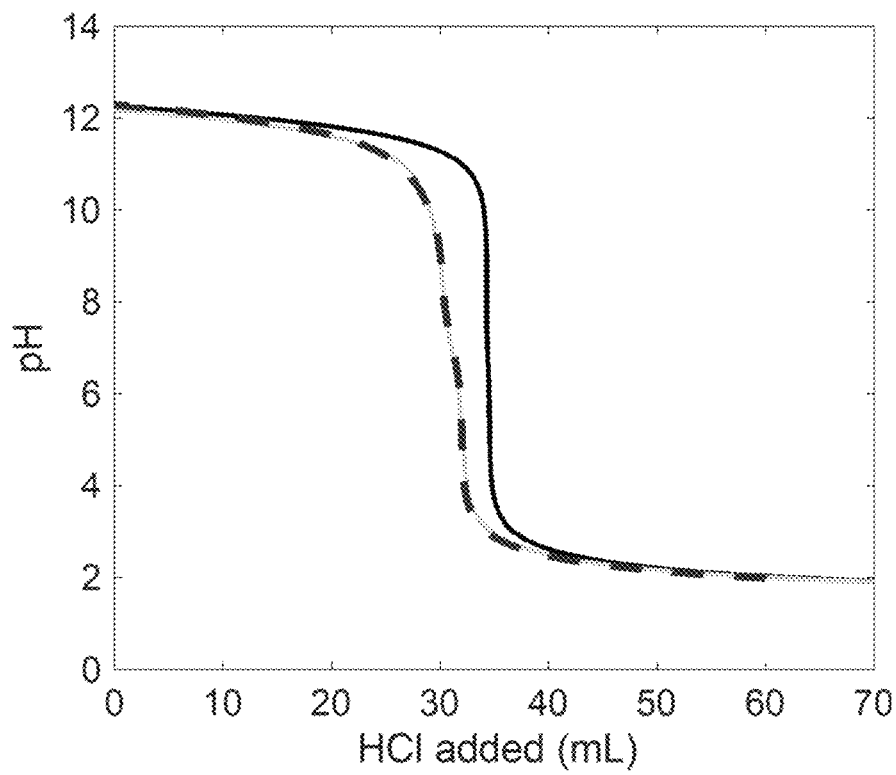

Electrode material with mass 0.2 g was ground to a powder and added to a vessel containing 35 mL of 0.05 M NaOH and 35 mL of 18.2 MΩ DI water (Synergy Water Purification System, Merck Millipore, USA). The solution was bubbled with $N_2$ gas under stirring for 20 minutes, then sealed and equilibrated under stirring for 24 hours. The solution was then transferred to a closed vessel in the titration system (iAquatrode Plus and 904 Titrando, Metrohm AG, Switzerland) and bubbled with $N_2$ for an additional 16 minutes. The nitrogen flow was then reduced to one bubble every several seconds to prevent air intrusion in the vessel. The solution was stirred for 4 minutes, then automatically titrated with 70 mL of 0.05 M HCl with a signal drift of 0.5 mV/min. A blank sample without electrode was titrated in the same manner without the initial 20-minute bubbling and 24 hr equilibration steps. The titration curves are shown in FIGS. 4A-4B.

Figure 4C:
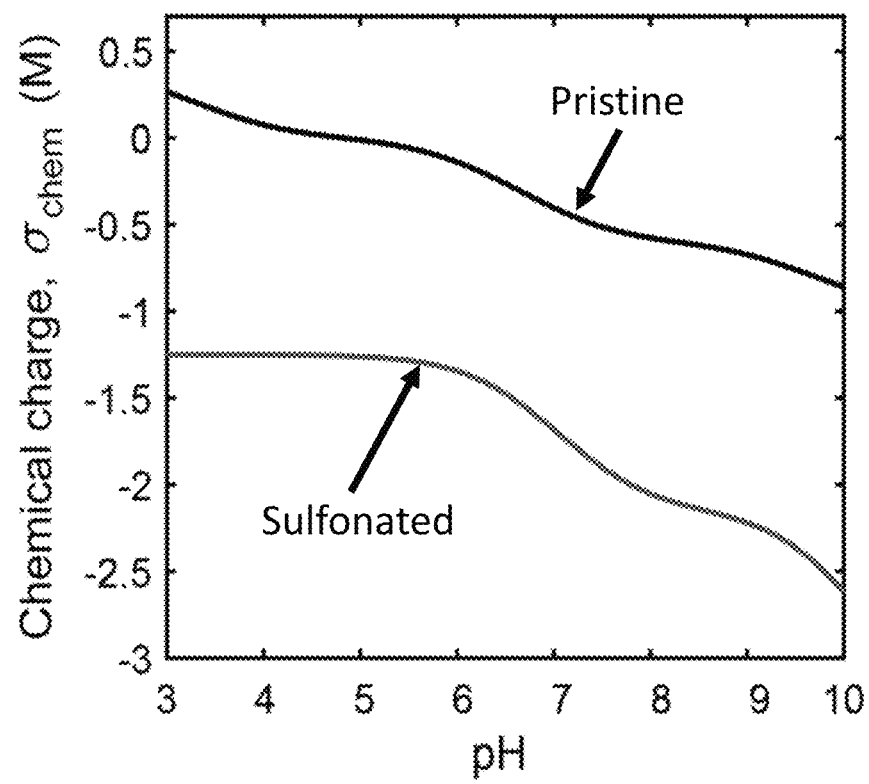
FIG. 4C: Measured nanopore chemical charge concentration of the electrodes of FIG. 3 determined from fitting results of acid-base titrations to a nanopore electric double layer (EDL) model.

The nanopore chemical surface charge, $\sigma_{chem}$, which is shown in FIG. 4C, was determined by fitting experimental results of the direct titrations of the carbon material immersed in a strong basic solution. Results show that the pristine material is mildly charged with a significant pH dependence of the measured chemical charge, indicating the presence of uniquely weak acidic and basic functional groups. By contrast, the sulfonated electrode is strongly negatively charged with negative chemical surface charges of between about −1.25 to −2.5 M for the entire pH range tested, indicating significant strong acid behavior. Thus, sulfonated electrodes possess high negative nanopore chemical surface charges, $\sigma_{chem^-}$, regardless of local cell pH environment.

Example 3—CDI Cell Preparation

The custom-built flow-through electrodes (FTE) CDI cell consisted of two electrodes electronically isolated by a separator (Whatman 2 cellulose filter paper, GE Life Sciences, 2.7 cm×2.7 cm, ~190 μm thickness). Graphite current collectors (FC-GR, Graphitestore.com) contact the posterior side of each electrode. A 9×9 grid of 1.5 mm diameter holes was milled into each collector to allow water passage. The cell is enclosed on both sides with milled PVDF blocks, which each contain one fluid flow line and a vent line for air removal. A funnel was cut into the downstream-side block to facilitate water flow toward the fluid line. Compressible, laser-cut ePTFE gaskets (Gore-Tex NSG16X-GP, W. L. Gore & Associates, ~1.4 mm uncompressed thickness) provide sealing. The cell is assembled and closed with stainless steel bolts. The internal cell volume is approximately 1 mL. A cell schematic is given in FIG. 1C.

Example 4—CDI Cell Characterization Methods

Electronic Impedance Spectroscopy (EIS)

Determination of the separator resistance $R_{sp}$, the external electronic resistance $R_{EER}$, and the series resistance $R_s$ were determined from a method based on Hawks et al. and used as simulation parameters (Hawks, S. A.; Ramachandran, A.; Porada, S.; Campbell, P. G.; Suss, M. E.; Biesheuvel, P. M.; Santiago, J. G.; Stadermann, M. Performance Metrics for the Objective Assessment of Capacitive Deionization Systems. Water Res. 2019, 152, 126-137). EIS spectra were taken over the frequency range 700 kHz to 40 mHz in the CDI cell with a potentiostat (Reference 3000, Gamry, USA). A two-point configuration was used, where the cathode was connected to the counter and reference wires and the anode was connected to the working and working sense wires. Both P-P and S-P configurations were evaluated, and feed solution was flowed through the cell at 1 mL/min. Spectra were taken with different separator thicknesses, achieved by stacking 1-4 separators together. The minimum Re(Z) on each spectrum is the point of minimum phase angle, which was treated as $R_s$.

Example 5—CDI Cell Operation

The CDI experimental setup consisted of a 0.5 L glass bottle that served as the feedwater reservoir, a peristaltic pump (Masterflex 07551-30, Cole-Parmer, USA), the CDI cell, a conductivity sensor (Tracedec 390-70, Innovative Sensor Technologies GmbH, Austria), and a voltage source (2400 Source Meter, Keithley Instruments, USA), the latter of which was connected to the cell current collectors. The pump, cell, and conductivity sensor were connected via flexible tubing. Feedwater was drawn from the reservoir and first passed through the cell, then through the conductivity sensor. The cell was oriented so that water first passed through the cathode (electrode at negative potential) and then the anode (positive potential). The voltage source and pump were remotely controlled with a Matlab script. Current and voltage data were collected in Matlab, and conductivity data were recorded in the conductivity sensor software.

Feedwater comprising 0.5 mM $CaCl_2$ and 14 mM NaCl was prepared with $CaCl_2$ (>96%, Fisher Scientific UK), NaCl (>99.5%, SDFCL, India) and DI water. Prior to experiments, $N_2$ gas was bubbled at a high rate in a glass reservoir containing 0.5 L of feedwater for 20 minutes to remove dissolved oxygen, then maintained at a lower rate for the duration of the experiment. The feedwater was then pumped through the system at a flow rate of 1 mL/min and the cell was discharged at 0 V until the current was negligible (<|0.1| mA in the S-P cell or <|0.01| mA in the P-P cell) in order to equilibrate the electrodes with the feedwater before beginning the experiment.

Experiments were carried out under the general framework described by Hawks, and performance metrics and indicators are reported according to the definitions therein. In each experiment, the cell was charged at a constant voltage (0.4-2.5 V) and discharged at 0 V in repeated cycling with a 1 mL/min feedwater flow rate. Each cycle lasted for a full-cycle time (FCT) of 6-30 min, which was divided equally into charge and discharge steps. Conditioning cycles were carried out until the cell reached the limit cycle, which is the cycle where the conductivity curve reaches dynamic steady-state behavior. Desalinated effluent was then collected for the limit cycle while the effluent conductivity was lower than the feedwater conductivity, and water with conductivity above the feed value was discarded to a waste container. For FCT 6 min, the limit cycle and the two following cycles were collected together in the same manner in order to accumulate enough liquid for post-CDI analysis. Each collected sample was weighed to calculate its volume assuming a liquid density of 1 g/mL.

Example 6—Post-CDI Analysis

Sample Conductivity and pH Determinations

To measure conductivity, each desalinated water sample was pumped through the conductivity sensor at a 1 mL/min flow rate until the reading stabilized (~3 min). During the first 1.8 minutes of the measurement, the solution exiting the sensor was discarded. After this interval, the measured conductivity was within 2% of the stabilized reading, and the solution exiting the sensor was recovered and mixed with the sample. This recovery was necessary to ensure enough sample was available for the subsequent pH and $Ca^{2+}$ measurements, and its effect on measurements was found to be negligible. Recovery was not performed for experiments with 30 min FCT. The sensor and tubing were flushed with DI water between measurements. The sensor was calibrated with KCl 1.41 mS/cm standard (1.01203, Merck) at a 1 mL/min flow rate.

The pH of each sample was measured with the pH electrode and module (iAquatrode Plus and 904 Titrando, Metrohm AG, Switzerland) under stirring with a drift criterion of 1 mV/min. These measurements were always carried out after conductivity measurements so as not to artificially increase the sample conductivity with the pH sensor filling electrolyte (KCl 3 M). The electrode was thoroughly rinsed with DI water between measurements and was calibrated with standard Metrohm buffers of pH 4, 7, and 9.

$Ca^{2+}$ and $Na^+$ Concentration Determinations

The $Ca^{2+}$ concentrations were measured via standard addition. 5 mL of sample and 10 mL of KCl 1 M ionic strength adjuster (ISA) were pipetted into a glass beaker. The $Ca^{2+}$ ion-selective electrode (6.0510.100, Metrohm) was immersed in the resulting solution, and $CaCl_2$ 0.1 M standard (21059, Sigma-Aldrich, USA) was manually pipetted in increments of 0.1, 0.2, and 0.5 mL. A drift criterion of 1 mV/min was used for each increment. The sample concentration was back-calculated to account for the initial dilution with ISA. Before each measurement, the ion-selective electrode was rinsed for at least 30 s in DI water, which was regularly replaced. Each measurement was performed at constant temperature (~25° C.).

The $Na^+$ concentrations were calculated via:

$$c_{Na^+}(mM) = \frac{\kappa - 2c_{Ca^{2+}}\Lambda_{CaCl_2} - 10^{3-pH}\Lambda_{H^+}^0}{\Lambda_{NaCl}} \quad \text{Equation (2)}$$

where $c_{Ca^{2+}}$ is the sample $Ca^{2+}$ concentration and pH is the sample pH. The equivalent conductivities $\Lambda_{CaCl_2}$=115.59 mS/cm/mM and $\Lambda_{NaCl}$=115.7 mS/cm/mM are values at 20 mM ionic strength, while $\Lambda_{H^+}^0$=349.65 mS/cm/mM is at infinite dilution.

Example 7—CDI Experiments Analysis

Figure 5A:
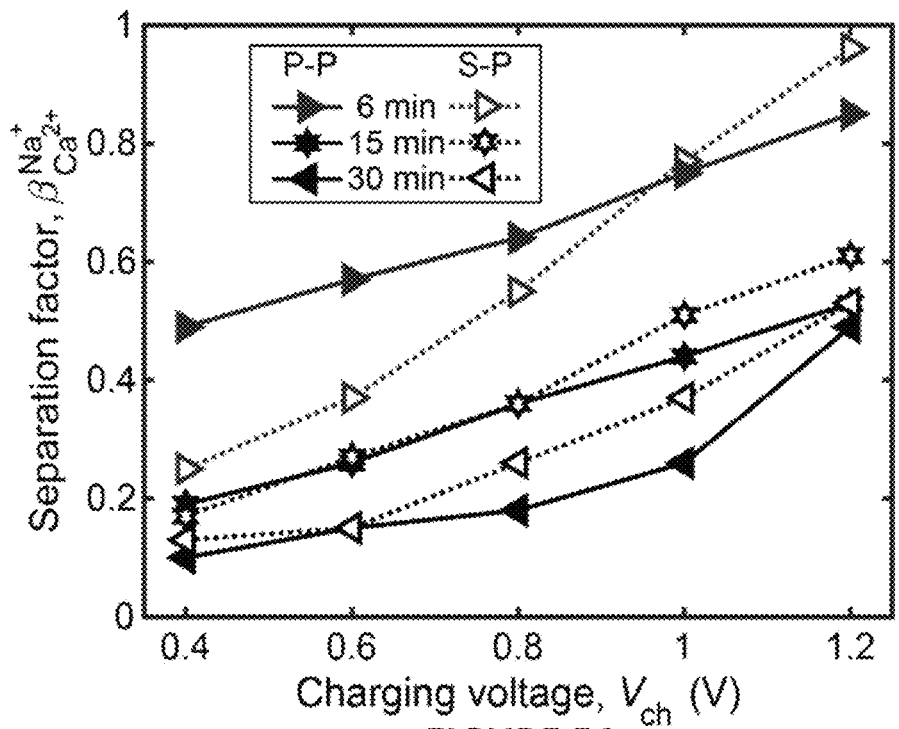
FIG. 5A: Separation factor for the pristine-pristine (P-P, labeled by full symbols) and sulfonate-modified-pristine (S-P, labeled by empty symbols) electrode capacitor assemblies for full cycle times (FCTs) of 6 min (labeled by right pointing triangle symbol), 15 min (labeled by snowflake symbols), and 30 min (labeled by left-pointing triangle symbols).

The experimental performance of the CDI cell with pristine cathode (P-P cell) or sulfonated cathode (S-P cell) was evaluated, wherein the S-P cell contains a high concentration of negatively charged sulfonic groups. All experiments involved equally long charging and discharging steps, a feed conductivity of 1.75 mS/cm, and a feed SAR=20 (14 mM NaCl and 0.5 mM $CaCl_2$)), and are from the limit cycle, i.e., the cycle at which the conductivity profile reaches a dynamic steady state. FIG. 5A depicts the measured $Na^+$ separation factor, $\beta_{Ca^{2+}}^{Na^+}$, vs. charging voltage, $V_{ch}$, for a discharge voltage of 0 V and for full cycle times (FCTs) of 6, 15, and 30 min, which have charging steps corresponding respectively to $\hat{t}$ of 0.67, 1.67, and 3.33, wherein $\hat{t}$ is the scaled charging time:

$$\hat{t} \equiv tD_{Na^+}/l_e^2, \quad \text{Equation (3)}$$

where t is time and $D_{Na^+}$ is the $Na^+$ ion diffusivity at infinite dilution. The results at 15 and 30 min FCT are very similar for P-P and S-P cells, with a strong $Ca^{2+}$ preference for all charging times. For example, at 30 min FCT and 0.4 V, $\beta_{Ca^{2+}}^{Na^+}$=0.1 in the P-P cell, and at 1.2 V it rises to 0.49. However, the two cells exhibit significantly different trends at 6 min FCT. The P-P cell separation factor ranges between 0.49 at 0.4 V and 0.85 at 1.2 V, whereas in the S-P cell the increase is much sharper, from 0.25 at 0.4 V to 0.96 at 1.2 V. This latter result indicates that the sulfonated cathode enables stronger divalent selectivity at low $V_{ch}$, yet stronger monovalent selectivity at high $V_{ch}$ relative to a pristine cathode. Without wising to being bound by theory or mechanism of action, it is contemplated that these results are due to distinct differences in $Ca^{2+}$ adsorption, as in the P-P cell, $Ca^{2+}$ removal depends strongly on $V_{ch}$, while $Ca^{2+}$ removal in the S-P cell is nearly independent of $V_{ch}$ (FIGS. 6A-6D).

Figure 5B:
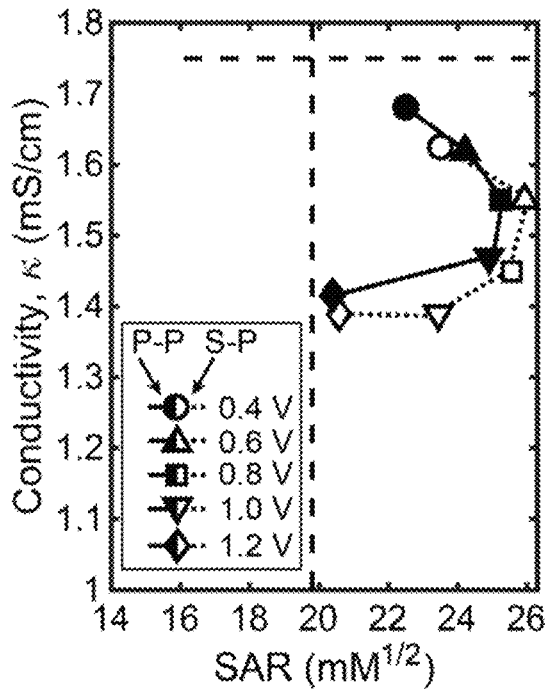
Figure 5C:
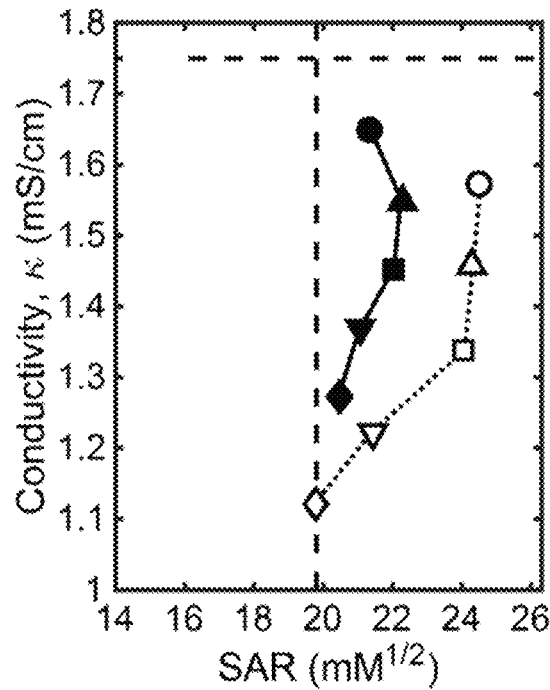
Figure 6C:
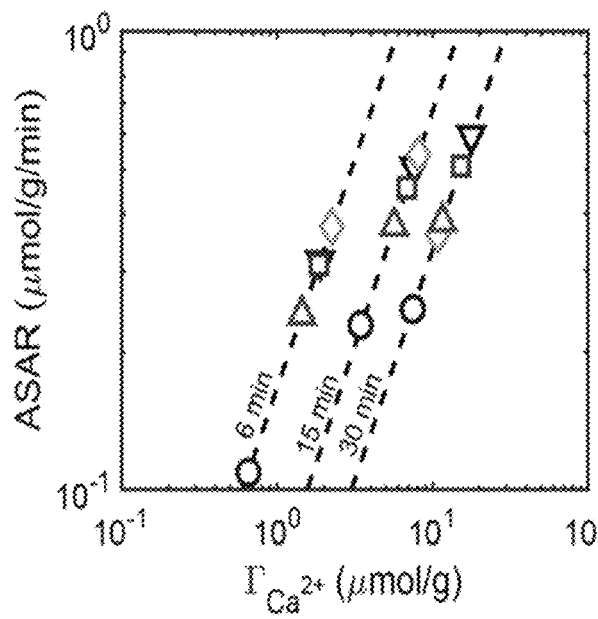
Figure 6D:
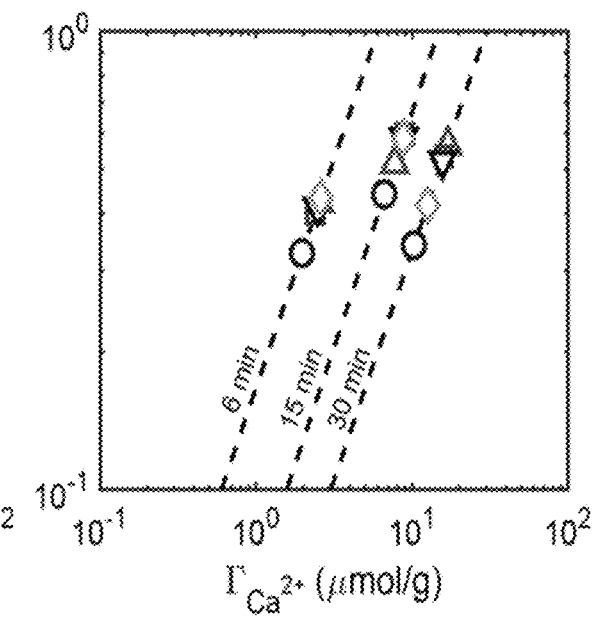

The sodium adsorption ratio is defined as:

$$SAR = c_{Na^+}/\sqrt{c_{Ca^{2+}} + c_{Mg^{2+}}}, \quad \text{Equation (4)}$$

where the concentrations of $Na^+$, $Ca^{2+}$, and $Mg^{2+}$ are in units of mM. In this work, $C_{Mg^{2+}}$=0 and so SAR=$C_{Na^+}/\sqrt{c_{Ca^{2+}}}$. The effects of $V_{ch}$, FCT, and cell type on effluent conductivity and SAR are shown in FIGS. 5B-5D, with dashed horizontal and vertical lines representing the feed conditions. At the longest FCT of 30 min, FIG. 5B shows that, for both the P-P and S-P cells, higher $V_{ch}$ typically decreases conductivity but increases SAR above its feed value by several units. In FIG. 5C for the FCT of 15 min, both cells deliver a reduction in conductivity as compared to the feed, but the output SAR remains at or above the feed value at all tested conditions. By contrast, the FCT of 6 min is sufficiently short to selectivity store Na$^+$ and reduce SAR below the feed value. FIG. 5D displays the trends of heightened reductions of SAR and conductivity with increasing $V_{ch}$ at this FCT, for the P-P cell culminating at 1.2 V with output values of 17.3 and 1.22 mS/cm, respectively. The S-P cell displays the same trend, but achieves improved performance with an output value of 16.0 with a conductivity of 1.12 mS/cm at 1.2 V. These findings demonstrate the benefit of using a sulfonated cathode for enhancing monovalent selectivity.

Figure 7A:
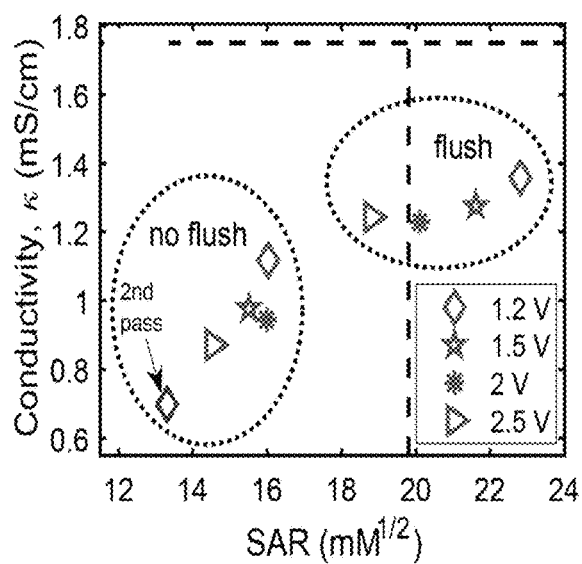

Due to the promising results obtained with short cycle times as presented in FIGS. 5A-6D, the inventors have explored extending the charging voltage window to further reduce SAR and conductivity of the treated water. Without wishing to being bound by theory or mechanism of action, it is contemplated that electrode degradation is largely absent at such short cycle times, therefore allowing to raise the cell voltage. FIG. 7A shows that increasing $V_{ch}$ to 1.5, 2, and 2.5 V with a 6 min FCT in the S-P cell culminated in a SAR of 14 and conductivity of 0.81 mS/cm at 2.5 V, a decrease of 6 SAR units and a ~54% conductivity reduction from the feed solution. Furthermore, a 2$^{nd}$ pass of product water from the 1.2 V and 6 min FCT experiment resulted in an even lower SAR of 13.3 and conductivity of 0.69 mS/cm, also shown in FIG. 7A.

Incorporating a flush step into the CDI cycle was also explored, where the flush step occurs after each half cycle while the cell is held at zero current, in order to prevent resalination of the product water and desalination of the brine. Each flush step lasted for 1 min, during which the flow rate was raised to 5 mL/min. FIG. 7A shows that flushing increases SAR significantly, but still results in a net reduction from the feed conditions at 2.5 V. The flush step increases product water conductivity relative to no-flush operation, as some feed water is flushed into the product water. This served to raise productivity from ~46 L/hr/m$^2$ without flushing to ~93 L/hr/m$^2$ with flushing. It should be noted that the productivity only depends on the type of flush operation in this work, as the cell geometry and charge/discharge flow rate were uniform for all FCT, $V_{ch}$, and electrode configurations.

Figure 7B:
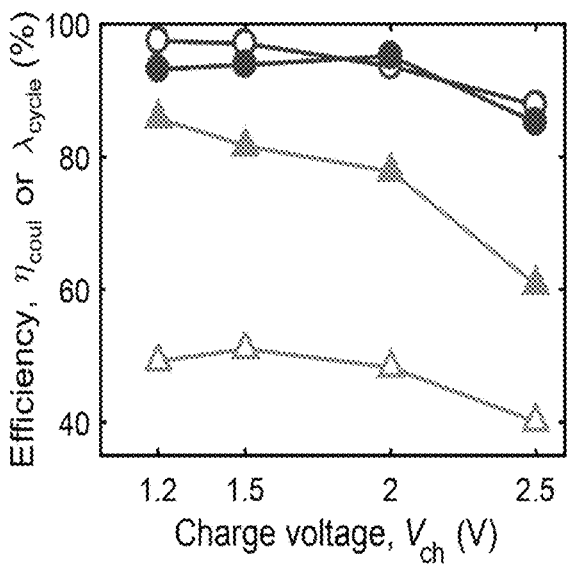

To evaluate further the strategy of extended voltage windowing, FIG. 7B shows the measured Coulombic and charge efficiencies from the experiments in FIG. 7A. Coulombic efficiency is an indicator of the magnitude of charge lost to Faradaic side-reactions, and is defined as $\eta_{coul}=|q_{dis}/q_{ch}|$, where $q_{ch}$ is the electric charge transferred between the electrodes during the charge step and $q_{dis}$ is the charge stored in the electrodes and subsequently released during the discharge step. Coulombic efficiencies of approximately 100% imply that side reactions are nearly absent, while lower values reveal that significant charge was lost to side reactions, and that likely degradation of the electrodes occurred during cycling. FIG. 7A shows that Coulombic efficiency differs by no more than 5% between the flush and no flush modes for each $V_{ch}$. Furthermore, the Coulombic efficiency is greater than 93% up to 2 V. At 2.5 V, the drop in Coulombic efficiency to 85% (flush) and 88% (no flush) indicates that this value of $V_{ch}$ may be less suitable for long-term CDI operation. FIG. 7B also shows the flush step greatly increases the charge efficiency relative to the no-flush mode. Charge efficiency for this system is $$\Lambda_{cycle}=m(\Gamma_{Na^+}+2\Gamma_{Ca^{2+}})/Fq_{dis},\qquad\text{Equation (5)}$$

where F is the Faraday constant and indicates the ratio of ion moles removed to moles of charged stored in the electrodes (calculated from $q_{dis}$ because part of $q_{ch}$ may be lost to faradaic reactions). Charge efficiencies near 100% mean that nearly all stored charge removes ions from water, while lower values signify that a substantial amount of charge liberates ions from the electrodes to the feed, hindering desalination. The low charge efficiencies of 40-50% in the no-flush experiments result from re-salinization of the desalted water present in the cell immediately after charging. It can be summarized that incorporating a flush step led to improvements in charge efficiency, ion adsorption, and productivity, but the output water quality was lowered for irrigation in terms of conductivity and SAR.

Figure 8A:
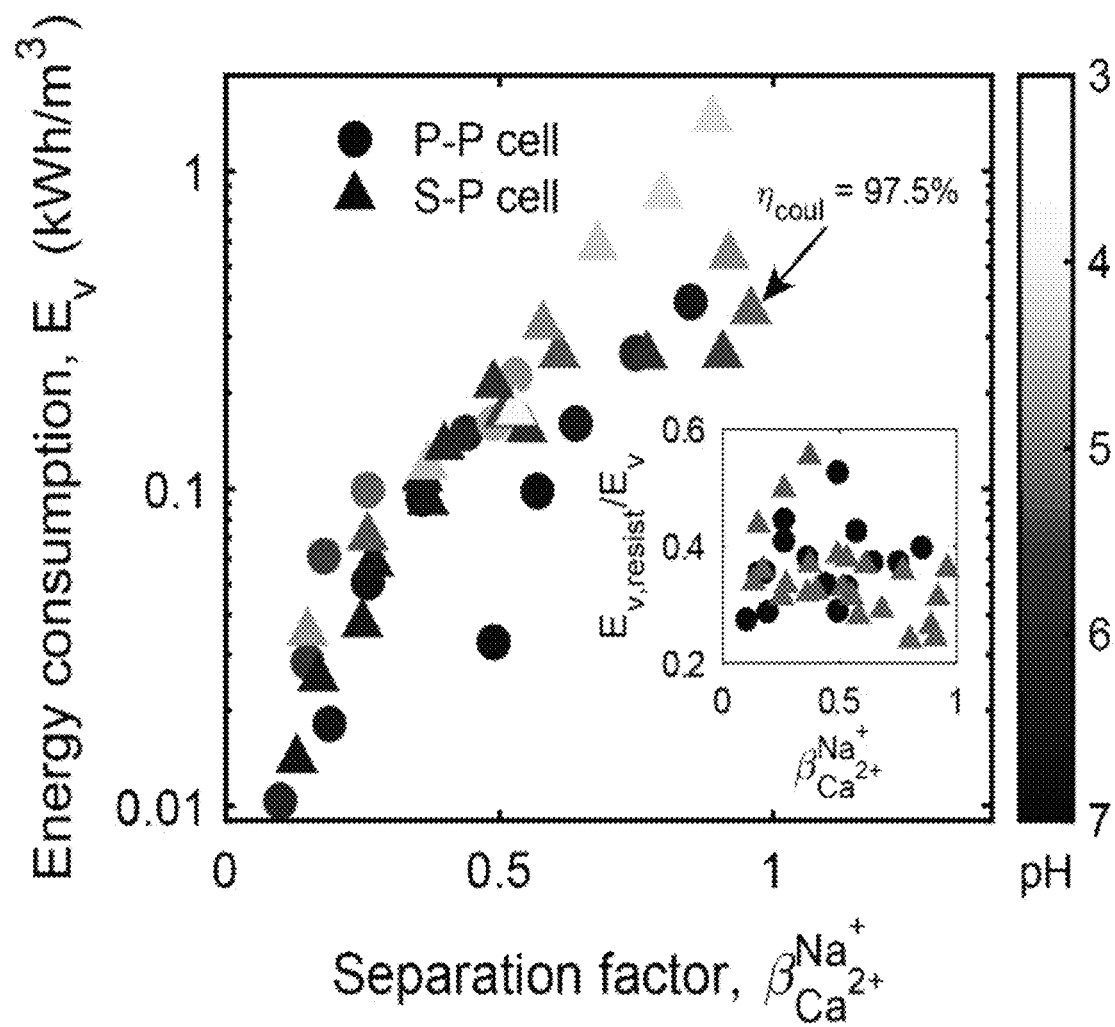
FIGS. 8A-8B: Energy input requirements and thermodynamic efficiency, wherein P-P electrode capacitor assembly is labeled by circles, S-P electrode capacitor assembly is labeled by triangles, symbol color indicates the product water pH.

FIG. 8A shows the energy consumption per unit product water, $E_v$, for the results shown in FIG. 3 and FIG. 4 (excluding the 2$^{nd}$ pass results). Energy consumption increases by several orders of magnitude, from ~0.01-0.1 kWh/m$^3$ at separation factors of order 0.1, to ~0.3 kWh/m$^3$ for separation factors of ~1. These values were contextualized relative to resistive losses per unit product water, approximated via $$E_{v,resist}\approx\langle I^2\rangle\cdot FCT\cdot R_s/\bar{V},\qquad\text{Equation (6)}$$

where $\langle I^2\rangle=(1/FCT)\int_{FCT}I^2dt$ is the time-averaged squared current over a full charge-discharge cycle and $R_s$ is the series resistance for one separator layer, determined from electrode impedance spectroscopy (EIS) measurements. The inset in FIG. 8A reveals that series resistive losses are a significant fraction of overall energy input, yet the lowest losses occur at highest separation factors in the S-P cell. Returning to the main plot of FIG. 8A, the S-P cell tends to acidify the output water to a greater degree than the P-P cell as evidenced by the color of each marker, particularly at separation factors greater than ~0.7. Separation factors around 1 are achieved at high voltages and short cycle times (in FIG. 7A), which result in the most favorable SAR and conductivity outputs as seen in FIG. 7B. Thus there is a trade-off between the degree of Na$^+$ selectivity and the output water pH. For example, at the highest achieved separation factor of 0.96, the output pH is reduced to 5.1 from a feed value of ~7, even with a Coulombic efficiency of 97.5% (1.2 V, 6 min FCT, S-P cell).

Figure 8B:
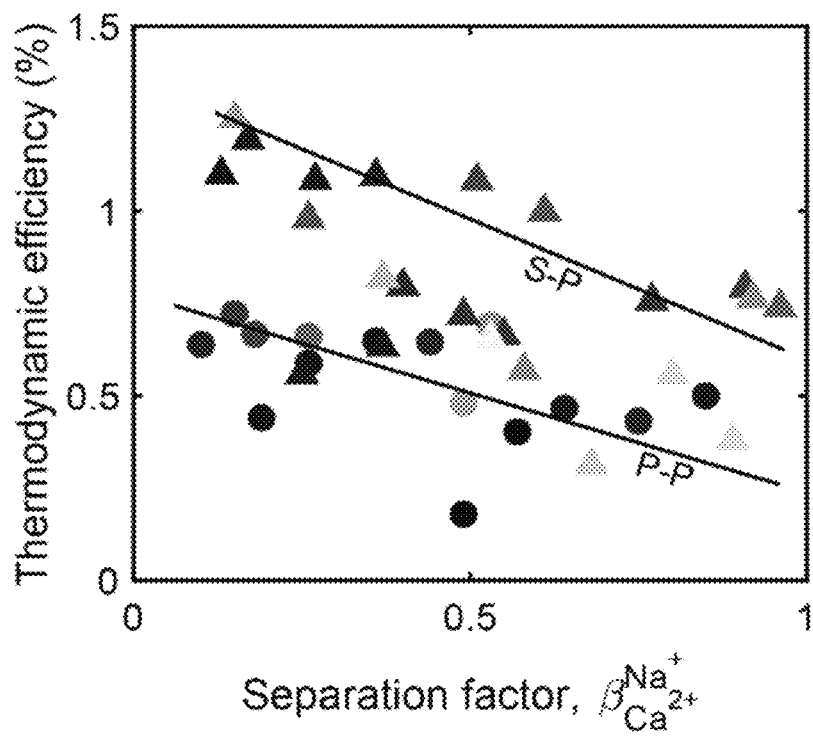

FIG. 8B displays the thermodynamic energy efficiency of the results shown in FIG. 8A. Thermodynamic efficiency is calculated by dividing $E_v$ by the minimum thermodynamic desalination energy, $$E_{min}=RT\sum_i v_i\left[\frac{c_{F,i}}{WR}\ln\left(\frac{c_{B,i}}{c_{F,i}}\right)-c_{P,i}\ln\left(\frac{c_{B,i}}{c_{P,i}}\right)\right],\qquad\text{Equation (7)}$$

where i is over NaCl and CaCl$_2$), the van't Hoff factors $v_i$ are 2 for NaCl and 3 for CaCl$_2$), the subscripts F, B, and P represent feed, brine, and product, respectively, and the water recovery is WR=$v_P/v_F$. The water recovery is assumed to be WR=0.5 for all calculations. FIG. 8B shows that thermodynamic efficiency generally decreases with increasing separation factor. This result is expected, since the processes that result in higher $Na^+$ selectivity have higher average salt removal rates and thus depart further from thermodynamic equilibrium. FIG. 8B further reveals that thermodynamic efficiency is generally higher for the S-P cell. It should be emphasized that values reported in FIG. 5 for energy consumption and thermodynamic efficiency are for zero energy recovery since discharge occurs at 0 V, and for a largely unoptimized cell. Significantly lower energy input could be obtained with energy recovery and additional cell optimization.

Figure 9:
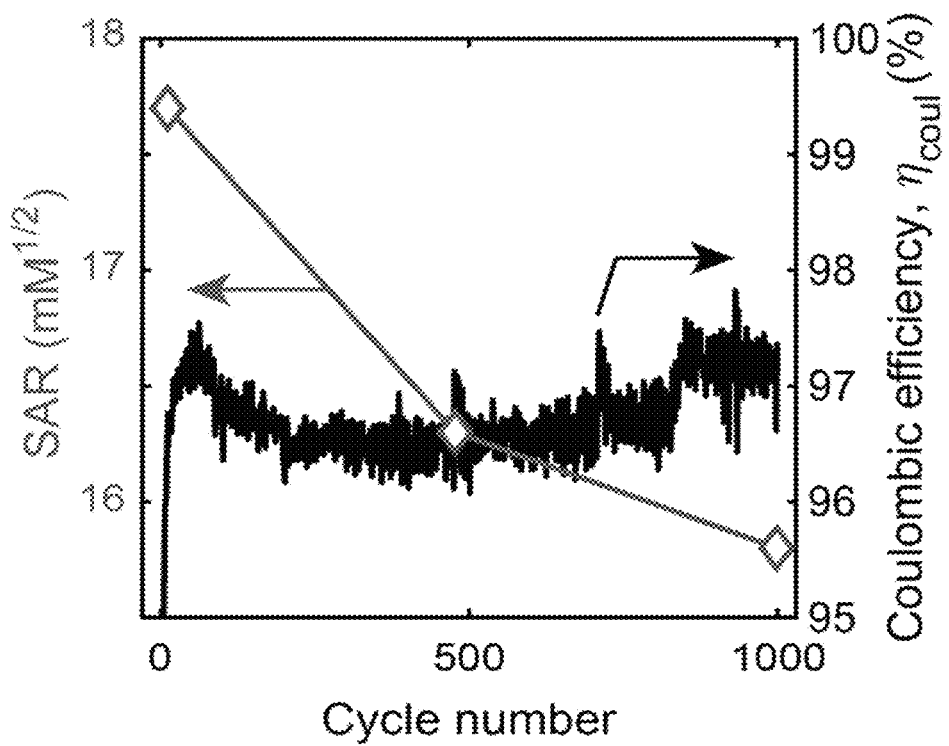
FIG. 9: Output SAR and coulombic efficiency for 1000-cycle experiment at 1.2 V and 6 min FCT, S-P electrode capacitor assembly.

Returning to the results of FIG. 7A, the significant SAR and conductivity reductions at 1.2 V and 6 min FCT in the S-P cell (without flushing) are accompanied by a coulombic efficiency above 97%, and the relatively insignificant faradaic losses suggest that the electrodes are stable under long-term cycling at these conditions. A 1000-cycle experiment at these conditions, and FIG. 6 surprisingly show that output SAR continually improves during cycling, from 17.7 at the limit cycle to 15.8 at the end of the experiment. Without wishing to being bound by theory or mechanism of action, it is contemplated that this improvement is due to a drastic reduction in $Ca^{2+}$ adsorption from 2.6 to 1.1 μmol/g, whereas $Na^+$ adsorption only modestly decreases from 65 to 55 μmol/g. Together, these results increase the Nat separation factor from 0.83 to 1.6. The right-side axis of FIG. 9 reveals coulombic efficiency remains between 96-98% after dynamic steady-state behavior is reached. It has therefore been shown that the CDI system is not only stable at the given conditions, but the output water quality actually improves with repeated cycling.

It is appreciated by persons skilled in the art that the present invention is not limited by what has been particularly shown and described hereinabove. Rather the scope of the present invention includes both combinations and subcombinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. A method for selective separation of monovalent ionic species from an ionic solution, the method comprising:
   (a) passing the ionic solution comprising a positively charged monovalent ion and a positively charged polyvalent ion, through an electrode capacitor assembly comprising:
      a first electrode and a second electrode, said electrodes comprising nanoporous carbon, wherein the first electrode is modified with sulfonate surface groups; and at least one flow channel for the passage of the ionic solution; and
   (b) charging the electrode capacitor assembly:
      (1) at a voltage of at least about 2.0 V; and
      (2) for a scaled charging time of less than about 0.5, thereby providing enhanced adsorption of the positively charged monovalent ion in the first electrode as compared to the adsorption of the positively charged polyvalent ion.

2. The method according to claim 1, wherein step (b) comprises charging the electrode capacitor assembly:
   (1) at a voltage of at least about 2.25 V; and
   (2) for a scaled charging time of less than about 0.5.

3. The method according to claim 1, wherein step (b) comprises charging the electrode capacitor assembly:
   (1) at a voltage of at least about 2.5 V; and
   (2) for a scaled charging time of less than about 0.5.

4. The method according to claim 1, further comprising step (c) comprising discharging the electrode capacitor assembly at a voltage of about 0 V.

5. The method according to claim 1, wherein steps (a) and (b) are repeated for at least about 1000 cycles or until conductivity of the ionic solution reaches dynamic steady-state behavior.

6. The method according to claim 5, wherein the method is performed without flushing the electrode capacitor assembly.

7. The method according to claim 5, wherein the method further comprises flushing the electrode capacitor assembly.

8. The method according to claim 1, wherein step (a) comprises passing the ionic solution with water productivity ranging from about 5 to about 500 $L/m^2$ hr.

9. The method according to claim 1, wherein the first electrode is further modified with sulfate surface groups.

10. The method according to claim 1, wherein the first electrode comprises a negatively charged negative chemical concentration surface charges of between about −1.25 to −2.5 M at a pH range between about 3 and 10.

11. The method according to claim 1, wherein the first electrode has a specific nanopore volume of at least about 0.25 mL/g and/or a mean pore diameter ranging from about 0.5 to about 2 nm.

12. The method according to claim 1, wherein the nanoporous carbon is selected from the group consisting of activated carbon, carbon black, graphitic carbon, carbon fibers, carbon microfibers, carbon aerogel, fullerenic carbon, carbon nanotubes (CNTs), graphene, carbide, carbon onions, carbon paper, and any combination thereof.

13. The method according to claim 1, wherein the first electrode comprises activated carbon which is modified with sulfonate surface groups and sulfate surface groups and the second electrode comprises activated carbon, which is not chemically modified.

14. The method according to claim 1, wherein the positively charged monovalent ion is selected from the group consisting of: $Na^+$, $Li^+$, $K^+$, $Au^+$, $Ag^+$, and Cut, and the positively charged polyvalent ion is selected from the group consisting of: $Ca^{2+}$, $Mg^{2+}$, $Fe^{2+}$, $Fe^{3+}$, $Pb^{2+}$, $Hg^{2+}$, $Cd^{2+}$, $In^{3+}$, $Ru^{3+}$, $Ru^{4+}$, $Zn^{2+}$, $Co^{2+}$, $Co^{3+}$, $Pt^{2+}$, $Pt^{4+}$, $Au^{3+}$, $Sn^{4+}$, $Sn^{2+}$, and $Cu^{2+}$.

15. The method according to claim 1, wherein the at least one flow channel is formed by at least one of a separator, membrane, gasket, spacer, and salt bridge, and/or wherein the electrode capacitor assembly further comprises a first current collector and a second current collector, wherein the first electrode is positioned between the first current collector and the at least one flow channel, and the second electrode is positioned between the at least one flow channel and the second current collector.

16. The method according to claim 13, wherein the first electrode, the second electrode, or both comprise a flowable nanoporous carbon electrode in the form of a suspension and/or a fluidized bed electrode.

17. The method according to claim 1, wherein the ionic solution flows into the at least one flow channel directly through the first electrode, wherein the flow within the at least one flow channel is configured orthogonally to an electrode surface plane.

18. The method according to claim 1, wherein the electrode capacitor assembly is a part of an agricultural irrigation system, wastewater treatment system, brackish water desalination system or chemical reactor.

19. The method according to claim 18, wherein the brackish water desalination system is configured in a form of a Capacitive Deionization (CDI) system or a Membrane Capacitive Deionization System (MCDI).

\* \* \* \* \*